US012761095B2

(12) United States Patent
Andrews et al.

(10) Patent No.: US 12,761,095 B2
(45) Date of Patent: Oct. 13, 2026

(54) METHODS AND APPARATUS OF DETERMINING A STRESS-RELATED CHARACTERISTIC OF A SUBSTRATE

(71) Applicant: CORNING INCORPORATED, Corning, NY (US)

(72) Inventors: Ryan Claude Andrews, Elmira, NY (US); David Matthew Berg, Rochester, NY (US); Pierre Michel Bouzi, Manassas, VA (US); William John Furnas, Elmira, NY (US); Jacob Immerman, Corning, NY (US); Jeremiah Robert Jacobson, Cambridge, MA (US); Katherine Anne Lindberg, Corning, NY (US); Andrew Allen Lindstrand, Big Flats, NY (US); Glenn Abram Newcomer, Pine City, NY (US); Evan Lewis Olson, Elmira, NY (US); Babak Robert Raj, Corning, NY (US); Nathaniel David Wetmore, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 91 days.

(21) Appl. No.: 18/825,641

(22) Filed: Sep. 5, 2024

(65) Prior Publication Data

US 2025/0085177 A1 Mar. 13, 2025

Related U.S. Application Data

(60) Provisional application No. 63/581,135, filed on Sep. 7, 2023.

(51) Int. Cl.

*G01L 1/24* (2006.01)
*G01J 3/14* (2006.01)

(Continued)

(52) U.S. Cl.

CPC ................ *G01L 1/241* (2013.01); *G01J 3/14* (2013.01); *G01J 4/02* (2013.01); *G01N 21/21* (2013.01);

(Continued)

(58) Field of Classification Search

CPC .... G01L 1/241; G01J 3/14; G01J 4/02; G01N 21/21; G01N 21/47; G01N 2021/4792

See application file for complete search history.

(56) References Cited

U.S. PATENT DOCUMENTS 10,156,488 B2 12/2018 Liu et al.
10,495,530 B2 12/2019 Liu et al.

(Continued)

FOREIGN PATENT DOCUMENTS

CN 205066980 U 3/2016
CN 205642680 U 10/2016

(Continued)

OTHER PUBLICATIONS

Hodemann et al., "Measurement of stress build-up of ion exchange strengthened lithium aluminosilicate glass", J of Am Ceramic Soc, 103 (2019): pp. 1-14.

*Primary Examiner* — Dominic J Bologna
(74) *Attorney, Agent, or Firm* — Kevin M. Able

(57) ABSTRACT

Apparatus includes a sample holder with a cavity and a plurality of devices configured to hold a curvature of a curved substrate in a fixed configuration. Apparatus includes two prisms with a viewing apparatus of the sample holder configured to translate therebetween. Methods can include disposing the curved substrate in the sample holder, transmitting a first beam, translating the sample holder, and transmitting a second beam. Alternatively, apparatus include a light scattering-polarimetry sub-system configured to emit a first beam to impinge an end surface of coupling prism and (Continued)

detect at least a portion of the first beam impinging the first surface of the coupling prism. The apparatus includes an evanescent prism coupling spectroscopy sub-system configured to emit a second beam to impinge a first surface of the coupling system and detect at least a portion of the second beam impinging the second surface of the coupling prism.

29 Claims, 11 Drawing Sheets

(51) Int. Cl.
*G01J 4/02* (2006.01)
*G01N 21/21* (2006.01)
*G01N 21/47* (2006.01)

(52) U.S. Cl.
CPC ..... *G01N 21/47* (2013.01); *G01N 2021/4792* (2013.01)

(56) References Cited

U.S. PATENT DOCUMENTS 11,060,930 B2 * 7/2021 Shang ........................ G01L 1/24
11,105,612 B2 8/2021 Andrews et al.
2015/0066393 A1 * 3/2015 Liu .......................... G01L 1/241 702/42
2015/0308897 A1 * 10/2015 Roussev ................. G01L 1/242 356/73.1
2019/0271602 A1 * 9/2019 Schneider ............. C03C 21/005
2020/0300615 A1 * 9/2020 Andrews ................... G01J 4/02
2021/0156674 A1 * 5/2021 Furnas .................... G01L 1/241
2021/0157038 A1 5/2021 Andrews et al.
2021/0302632 A1 9/2021 Berg
2022/0276106 A1 * 9/2022 Andrews .................. G02B 5/04
2024/0315825 A1 9/2024 Bly et al.

FOREIGN PATENT DOCUMENTS

| | | | |
|---|---|---|---|
| CN | 112399964 | A | 2/2021 |
| JP | 2020-528790 | A | 10/2020 |
| JP | 7255594 | B2 | 4/2023 |
| KR | 10-2016-0048926 | A | 5/2016 |
| WO | 2019/195131 | A1 | 10/2019 |
| WO | 2020/008901 | A1 | 1/2020 |
| WO | 2021/108352 | A1 | 6/2021 |
| WO | 2021/202132 | A1 | 10/2021 |
| WO | 2023/097076 | A1 | 6/2023 |

* cited by examiner

METHODS AND APPARATUS OF DETERMINING A STRESS-RELATED CHARACTERISTIC OF A SUBSTRATE

CROSS REFERENCE TO RELATED APPLICATION

This application claims the benefit of priority under 35 U.S.C. § 119 of U.S. Provisional Application Ser. No. 63/581,135 filed on Sep. 7, 2023, the content of which is relied upon and incorporated herein by reference in its entirety.

FIELD

The present disclosure relates generally to methods and apparatus for determining a stress-related characteristic of a substrate and, more particularly, to methods and apparatus of determining a stress-related characteristic of a substrate using light scattering polarimetry and evanescent prism coupling spectroscopy.

BACKGROUND

Light-scattered polarimetry (LSP) uses scattered polarized light to determine stress-based characteristics of samples capable of scattering light from within the sample material. The sample is irradiated with input light at a relatively shallow angle. The light polarization is varied continuously between different polarization states using an optical compensator. The scattered light is detected by an image sensor. Stress in the sample causes optical retardation along the light path, with the amount of stress being proportional to the derivative of the optical retardation. The amount of optical retardation can be determined from the detected scattered light intensity distribution, which varies due to the constructive and destructive interference for the different effective path lengths of the detected light. The stress-related properties that can be measured include stress profiles, central tension (CT) and depth of compression (DOC). However, measurements can be subject to noise and measurements for the region in compression can be unreliable.

The evanescent prism coupling spectroscopy (EPCS) method measures refractive index and birefringence profiles (and thus stress) of samples. The EPCS method passes input light through the sample and a reference block in contact with the sample being measured. A prism is also used to couple light out of the sample to a transverse electric (TE) mode spectrum and a transverse magnetic (TM) spectrum that are measured by an image sensor. The TE and TM modes spectrum are analyzed to extract stress-related characteristics, including a stress profile.

The determination of stress-related characteristics often relies on a combination of LSP and EPCS measurements. Conventional approaches use different coupling prisms—if not completely different devices—for these measurements. However, the reliability and interpretation of such measurements relies on an assumption that either the substrate can be precisely aligned for each measurement or that the stress profile is substantially constant. Consequently, there is a need for apparatus and methods that facilitate reliable measurement by LSP and EPCS at the same location. For example, curved substrates can have spatially varying stress profile, although the apparatus and methods can provide benefits for substrates of any shape.

SUMMARY

There are set forth herein apparatus and methods for determining a stress-related characteristic of substrate using a combined apparatus including both a LSP apparatus and a EPCS apparatus. A combined apparatus for measurements using LSP and EPCS can simplify and speed up the measurement process. Also, the combined apparatus reduces the risk of sample breakage because less handling is required to load the sample into the combined apparatus as compared to two separate apparatus. Methods of using the combined apparatus can additionally produce more reliable measurements for overall stress profiles.

The apparatus can perform measurements at a single, common location (e.g., on the first major surface of the substrate). In particular, curved substrates pose a problem both because (1) the measurements associated with stress-related characteristics can change over relatively short distances across the first major surface and (2) curved substrates are more prone to shifting, especially when moved, changing the location measured. For measuring curved substrate, the present disclosure provides a sample holders with a plurality of supports (e.g., first set, second set, devices) can prevent the substrate from adjusting (e.g., moving) when measuring the substrate.

In one set of embodiments, a sample holder can be provided that can secure and move the substrate so that measurements can be performed on the same location on the substrate using a combined apparatus, where each subsystem (e.g., LSP and EPCS) can focus at physically different location, by securing and moving the substrate in the sample holder. Moving the sample holder away from the common plane defined by the coupling prisms when translating therebetween can reduce a risk of damaging (e.g., scratching) the substrate 103 during the process.

In another set of embodiments, both measurements (e.g., from the LSP apparatus and from the EPCS apparatus) can be performed using a single coupling prism and with the corresponding beams focused on a single measurement location (e.g., simultaneously). The apparatus can be configured to have at most one beam travelling in a given direction through each surface of the coupling prism (other than the coupling surface, which is unavoidable) to avoid mixing or interference between the signals. Consequently, the apparatus enable simultaneous or near simultaneous measurement at a common measurement location with both parts of the apparatus (e.g., from the LSP apparatus and from the EPCS apparatus). In aspects, providing a frustum surface of the coupling prism (and/or omitting an apex of the coupling prism) can reduce costs associated with the coupling prism without impairing the function of the coupling prism. For example, the reduced costs for a given size of coupling prism can enable a larger coupling prism to be used, which can further separate the paths associated with the second light source and the first detector. In aspects, providing two, non-parallel portions of a first surface of the coupling prism can enable both the second path and a portion of the first path to impinge respective portions at a substantially normal angles of incidence. Also, providing two, non-parallel portions of a first surface of the coupling prism can facilitate separation of the respective paths, which can facilitate physical arrangement of corresponding light source and detector (e.g., in a smaller physical footprint). In aspects, providing a reflecting device can facilitate physical orientation of the components in a reduced space.

Some example aspects of the disclosure are described below with the understanding that any of the features of the various aspects may be used alone or in combination with one another.

Aspect 1. An apparatus for determining at least one stress-related characteristic of a curved substrate, the apparatus comprising:

- a sample holder comprising a cavity configured to receive the curved substrate, the sample holder is translatable in a first direction between a first configuration and a second configuration, the sample holder comprising:
- a first set of supports configured to restrain movement of the curved substrate in the first direction;
- a second set of supports configured to restrain movement of the curved substrate in a second direction perpendicular to the first direction;
- a plurality of devices configured to hold a curvature of the curved substrate in a fixed configuration, the plurality of devices positioned within an area defined by the first set of supports and the second set of supports; and
- a viewing aperture configured to allow a measurement beam to travel therethrough between the cavity and a location outside of the sample holder;
- a first prism positioned such that the viewing aperture that is configured to allow a first beam of the measurement beam to travel between the first prism and the cavity configured to receive the curved substrate when the sample holder is in the first configuration; and
- a second prism positioned such that the viewing aperture that is configured to allow a second beam of the measurement beam to travel between the second prism and the cavity configured to receive the curved substrate when the sample holder is in the second configuration.

Aspect 2. The apparatus of aspect 1, wherein the curvature comprises a first radius of curvature from 0.1 millimeters to 10 meters.

Aspect 3. The apparatus of aspect 2, wherein the first radius of curvature is from 1 millimeter to 1 meter.

Aspect 4. The apparatus of any one of aspect 2-3, wherein the curvature comprises a second radius of curvature perpendicular to the first radius of curvature, the first radius of curvature is different from the second radius of curvature, and the second radius of curvature from 0.1 millimeters to 10 meters.

Aspect 5. The apparatus of any one of aspects 1-4, wherein the plurality of devices comprise a plurality of supports.

Aspect 6. The apparatus of any one of aspects 1-4, wherein the plurality of devices comprise a plurality of vacuum ports configured to apply a vacuum to the curved substrate.

Aspect 7. The apparatus of any one of aspects 1-6, wherein a coupling surface of the first prism and a coupling surface of the second prism are in a common plane.

Aspect 8. The apparatus of aspect 7, wherein the sample holder is configured to move the curved substrate away from the common plane when translating between the first configuration and the second configuration.

Aspect 9. The apparatus of any one of aspects 1-8, further comprising a track comprising a raised portion positioned between two coplanar track portions in the first direction, wherein the sample holder is configured to translate along the track with the sample holder configured to travel over the raised portion when translating the first configuration and the second configuration.

Aspect 10. The apparatus of any one of aspects 1-9, further comprising a linear actuator configured to translate the sample holder in the first direction.

Aspect 11. The apparatus of any one of aspects 1-10, further comprising a light-scattering polarimetry sub-system comprising:

- a first beam source configured to transmit the first beam that impinges the first prism and the viewing aperture when the sample holder is in the first configuration; and
- a first detector of the light-scattering polarimetry sub-system is configured to detect at least a portion of the first beam.

Aspect 12. The apparatus of any one of aspects 1-11, further comprising an evanescent prism coupling spectroscopy sub-system comprising:

- a second beam source configured to transmit the second beam that impinges the second prism and the viewing aperture when the sample holder is in the second configuration; and
- a second detector of the evanescent prism coupling spectroscopy sub-system is configured to detect at least a portion of the second beam.

Aspect 13. The apparatus of any one of aspects 1-12, wherein the first prism and the second prism are part of a unitary prism assembly.

Aspect 14. An apparatus for determining at least one stress-related characteristic of a substrate, the apparatus comprising:

- a sample holder comprising a cavity configured to receive the substrate, the sample holder comprising a viewing aperture;
- a prism positioned such that a measurement beam is configured to impinge the prism and the viewing aperture, the prism comprising a first surface, a second surface, an end surface, and a coupling surface, the coupling surface facing the viewing aperture;
- a light-scattering polarimetry sub-system comprising a first beam source and a first detector, the first beam source configured to transmit a first beam of the measurement beam that impinges the end surface of the prism and the viewing aperture, the first detector configured to detect at least a portion of the first beam, and the at least a portion of the first beam configured to impinge the first surface of the prism; and
- an evanescent prism coupling spectroscopy sub-system comprising a second beam source and a second detector, the second beam source configured to transmit a second beam of the measurement beam that impinges the first surface of the prism and the viewing aperture, the second detector of the evanescent prism coupling spectroscopy sub-system is configured to detect at least a portion of the second beam, and the at least a portion of the second beam configured to impinge the second surface of the prism.

Aspect 15. The apparatus of aspect 14, wherein the first beam and the second beam are configured to impinge substantially the same location of the viewing aperture.

Aspect 16. The apparatus of aspect 14, wherein the first beam and the second beam are configured to impinge substantially the same location of the substrate positioned in the cavity.

Aspect 17. The apparatus of any one of aspects 14-16, wherein the second surface of the prism faces the second detector.

Aspect 18. The apparatus of any one of aspects 14-17, wherein the first surface of the prism faces at least one of the first detector or the second beam source.

Aspect 19. The apparatus of aspect 18, further comprising a reflecting device facing the first surface of the prism, the reflecting device is configured to reflect the at least a portion of the first beam towards the first detector.

Aspect 20. The apparatus of aspect 19, wherein the reflecting device comprises a dichroic mirror or a beam splitter.

Aspect 21. The apparatus of any one of aspects 14-20, wherein the first beam source is configured to emit the first beam with a first wavelength that is different than a second wavelength of the second beam that the second beam source is configured to emit.

Aspect 22. The apparatus of any one of aspects 14-21, wherein the coupling surface extends between the first surface and the second surface.

Aspect 23. The apparatus of any one of aspects 14-22, wherein a first internal angle between the first surface and the coupling surface is greater than a second internal angle between the second surface and the coupling surface.

Aspect 24. The apparatus of any one of aspects 14-23, wherein the first surface, the second surface, and the end surface comprise an entire periphery of a cross-section of the prism.

Aspect 25. The apparatus of any one of aspects 14-23, further comprising a frustum surface of the prism extending between the first surface and the second surface.

Aspect 26. The apparatus of any one of aspects 14-25, wherein the first surface comprises a first portion and second portion, the first beam configured to impinge the first portion of the first surface of the prism, the at least a portion of the second beam configured to impinge the second portion of the first surface of the prism, and the first portion and the second portion are non-parallel.

Aspect 27. The apparatus of aspect 26, wherein an internal angle between the first portion of the first surface and the second portion of the first surface is from 150° to 175°.

Aspect 28. The apparatus of any one of aspects 26-27, wherein the first surface is continuous from the first portion of the first surface to the second portion of the first surface.

Aspect 29. The apparatus of any one of aspects 26-27, is discontinuous from the first portion of the first surface to the second portion of the first surface.

Aspect 30. The apparatus of any one of aspects 14-29, wherein the cavity is configured to receive the substrate comprising a curvature comprising a first radius of curvature from 0.1 millimeters to 10 meters.

Aspect 31. The apparatus of aspect 30, wherein the sample holder is configured to support the at least the curvature of the substrate.

Aspect 32. The apparatus of any one of aspects 14-31, further comprising a controller configured to determine the at least one stress-related characteristic from at least one of a first signal from the first detector generated by at least a portion of the first beam or a second signal from the second detector generated by the at least a portion of the second beam.

Aspect 33. The apparatus of aspect 32, further comprising an additional beam source configured to impinge the substrate with an additional beam, wherein the controller is configured to adjust a calculation to determine the at least one stress-related characteristic based on at least a path travelled by the additional beam.

Aspect 34. A method of determining at least one stress-related characteristic of a curved substrate comprising:

- disposing the curved substrate on a sample holder, the sample holder positioned in a first configuration, the sample holder further holding a curvature of the curved substrate in a fixed configuration with a plurality of devices, a coupling liquid positioned between a first coupling surface of a first prism and a first surface of the curved substrate in a viewing aperture of the sample holder;
- transmitting a first beam from a first beam source that impinges the first prism, the coupling liquid, and the first surface of the curved substrate at a measurement location;
- detecting at least a portion of the first beam with a first detector to generate a first signal;
- translating the sample holder from the first configuration to the second configuration in a first direction, the coupling liquid positioned between a second coupling surface of a second prism and the first surface of the curved substrate;
- transmitting a second beam from a second beam source that impinges the second prism, the coupling liquid, and the first surface of the curved substrate at the measurement location;
- detecting at least a portion of the second beam with a second detector to generate a second signal; and
- determining the at least one stress-related characteristic based on at least one of the first signal or the second signal.

Aspect 35. The method of aspect 34, wherein the disposing further comprises restraining movement of the curved substrate in the first direction with a first set of supports and restraining movement of the curved substrate in a second direction perpendicular to a second set of supports.

Aspect 36. The method of any one of aspects 34-35, wherein a plane tangent to measurement location on the first surface of the substrate is substantially parallel to a coupling plane that the first coupling surface of the first prism extends along.

Aspect 37. The method of any one of aspects 34-36, wherein the first coupling surface and the second coupling surface extend along a common plane, and the translating comprises moving the curved substrate away from the common plane when translating between the first configuration and the second configuration.

Aspect 38. The method of any one of aspects 34-37, wherein the translating comprises moving the sample holder along a track comprising a raised portion positioned between two coplanar track portions in the first direction such that the sample holder travels over the raised portion when translating between the first configuration and the second configuration.

Aspect 39. The method of any one of aspects 34-38, wherein the disposing further comprises applying a vacuum to the curved substrate through a plurality of devices comprising a plurality of vacuum ports.

Aspect 40. The method of any one of aspects 34-39, wherein the curvature comprises a first radius of curvature from 0.1 millimeters to 10 meters.

Aspect 41. The method of aspect 40, wherein the first radius of curvature is from 1 millimeter to 1 meter.

Aspect 42. The method of any one of aspects 34-41, wherein the curvature comprises a second radius of curvature perpendicular to the first radius of curvature, the first radius of curvature is different from the second radius of curvature, and the second radius of curvature from 0.1 millimeters to 10 meters.

Aspect 43. The method of any one of aspects 34-42, wherein a light-scattering polarimetry sub-system comprises the first beam source, the first prism, and the first detector, and the determining comprises processing the first signal to form an optical retardation versus depth curve.

Aspect 44. The method of any one of aspects 34-42, wherein an evanescent prism coupling spectroscopy sub-system comprises the second beam source, the second prism, and the second detector, and the determining comprises processing the second signal is processed to determine a mode spectrum.

Aspect 45. The method of any one of aspects 34-43, wherein the stress-related characteristic comprises a stress profile, a knee stress, a center tension, a tension-strain energy, a birefringence, a spike depth, a depth of layer, a refractive index profile, or combinations thereof.

Aspect 46. A method of determining at least one stress-related characteristic of a substrate comprising:

disposing the substrate on a sample holder, a coupling liquid positioned between a coupling surface of a prism and a first surface of the curved substrate in a viewing aperture of the sample holder;

transmitting a first beam from a first beam source that impinges an end surface of the prism, the coupling liquid, and the first surface of the substrate at a measurement location;

detecting at least a portion of the first beam with a first detector to generate a first signal, the at least a portion of the first beam impinges a first surface of the prism in traveling from the first surface of the substrate to the first detector;

transmitting a second beam from a second beam source that impinges the first surface of the prism, the coupling liquid, and the first surface of the substrate at the measurement location;

detecting at least a portion of the second beam with a second detector to generate a second signal, the at least a portion of the second beam impinges a second surface of the prism in travelling from the first surface of the substrate to the second detector; and determining the at least one stress-related characteristic based on at least one of the first signal or the second signal.

Aspect 47. The method of aspect 46, wherein the second surface of the prism faces the second detector.

Aspect 48. The method of any one of aspects 46-47, wherein the first surface of the prism faces at least one of the first detector or the second beam source.

Aspect 49. The method of aspect 48, further comprising reflecting the at least a portion of the first beam towards the first detector as the at least a portion of the first beam travels between the prism and the first detector.

Aspect 50. The method of any one of aspects 46-49, wherein the first beam source emits the first beam with a first wavelength that is different than a second wavelength of the second beam emitting by the second beam source.

Aspect 51. The method of any one of aspects 46-50, wherein the transmitting a first beam and the transmitting the second beam occur simultaneously.

Aspect 52. The method of any one of aspects 46-51, wherein the coupling surface extends between the first surface of the prism and the second surface of the prism.

Aspect 53. The method of any one of aspects 46-52, wherein a light-scattering polarimetry sub-system comprises the first beam source and the first detector, and the determining comprises processing the first signal to form an optical retardation versus depth curve.

Aspect 54. The method of any one of aspects 46-53, wherein an evanescent prism coupling spectroscopy sub-system comprises the second beam source and the second detector, and the determining comprises processing the second signal is processed to determine a mode spectrum.

Aspect 55. The method of aspect 54, wherein the evanescent prism coupling spectroscopy sub-system further comprises a lens with an adjustable focal length positioned between the prism and the second detector, the substrate comprises a curved substrate, and the method further comprises adjusting a focal length of the lens in response to at least a configuration of the curved substrate or a curvature of the curved substrate.

Aspect 56. The method of aspect 55, wherein the focal length f of the lens is adjusted in accordance with $$f = \frac{L}{1 + \frac{\gamma n_p L}{R1 \cos(\alpha)}}$$

where L is a distance between the lens and the first detector, R1 is a radius of curvature describing the curvature of the curved substrate at the measurement location, $\alpha$ is an angle of incidence of the first light beam when impinging the coupling surface of the prism, $n_p$ is a refractive index of the prism, and $\gamma$ is a parameter based on the configuration of the curved substrate.

Aspect 57. The method of aspect 56, wherein $\gamma$ is from 1 to 2.

Aspect 58. The method of any one of aspects 46-57, wherein a first internal angle between the first surface of the coupling prism and the coupling surface is greater than a second internal angle between the second surface of the prism and the coupling surface.

Aspect 59. The method of any one of aspects 46-58, wherein the first surface of the prism comprises a first portion and second portion, the first beam impinges the first portion of the first surface of the prism between the coupling surface and the first detector, the at least a portion of the second beam impinges the second portion of the first surface of the prism between the second beam source and the coupling surface, and the first portion and the second portion are non-parallel.

Aspect 60. The method of aspect 59, wherein an internal angle between the first portion of the second surface and the second portion of the second surface is from 150° to 175°.

Aspect 61. The method of any one of aspects 46-60, wherein the stress-related characteristic comprises a stress profile, a knee stress, a center tension, a tension-strain energy, a birefringence, a spike depth, a depth of layer, a refractive index profile, or combinations thereof.

Aspect 62. The method of any one of aspects 46-61, wherein the sample holder supports the substrate comprising a first radius of curvature from 0.1 millimeters to 10 meters at the.

Aspect 63. The method of any one of aspects 46-62, further comprising emitting an additional beam from an additional beam source that impinges the substrate, wherein the determining comprising determining the at least one stress-related characteristic based on at least a path travelled by the additional beam.

BRIEF DESCRIPTION OF THE DRAWINGS

The above and other features and advantages of aspects of the present disclosure are better understood when the following detailed description is read with reference to the accompanying drawings, in which.

Figure 1:
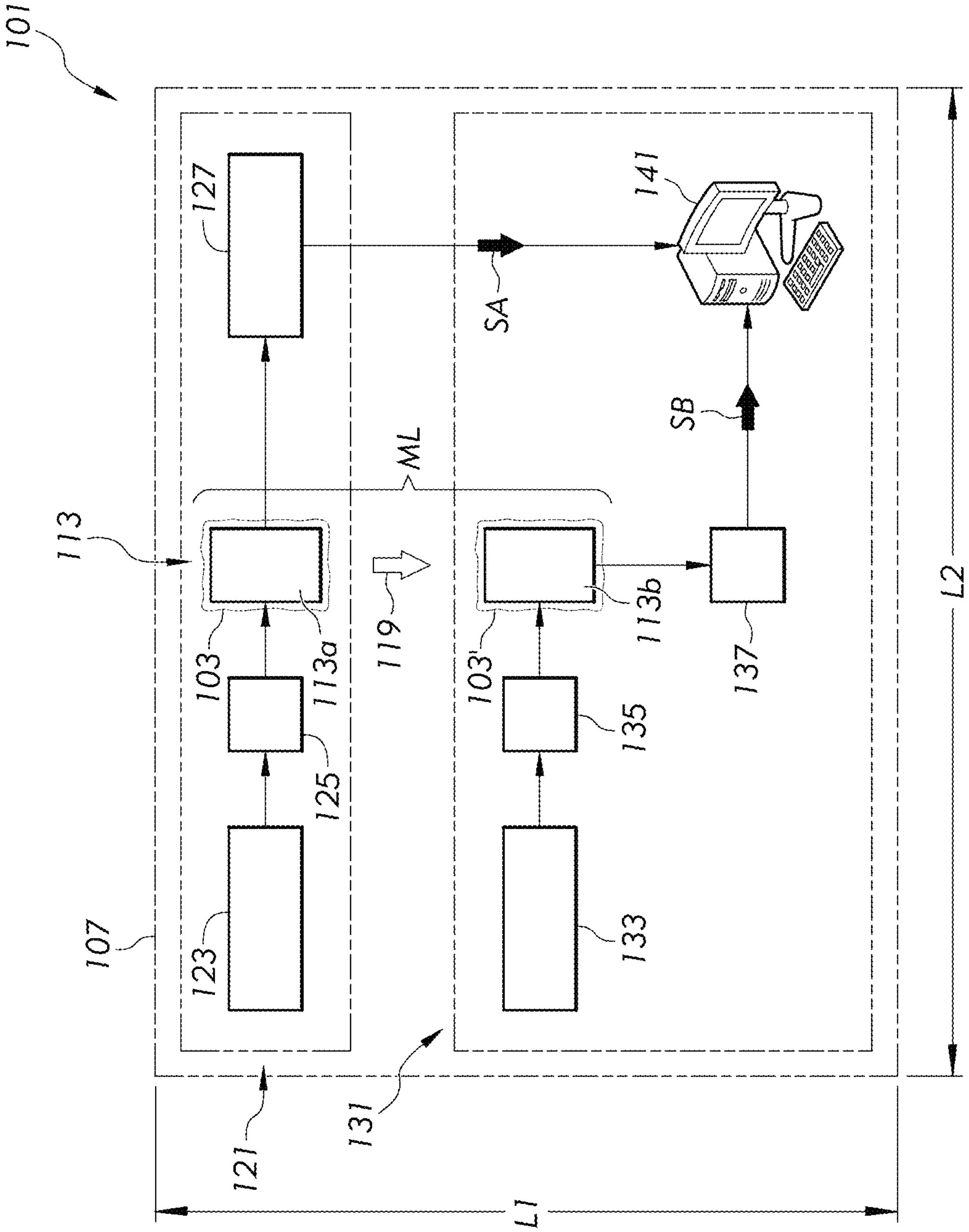
FIG. 1 is a schematic view of an example combined apparatus according to some aspects.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Aspects will now be described more fully hereinafter with reference to the accompanying drawings in which example aspects are shown. Whenever possible, the same reference numerals are used throughout the drawings to refer to the same or like parts.

FIGS. 1-6 and 8 illustrate views of a combined apparatus and/or associate sample holder in accordance with aspect of the disclosure. In one set of embodiments, as shown in FIGS. 1-6, the combined apparatus can use multiple coupling prisms (or different measurement locations on a unitary coupling prism) for LSP and EPCS measurements, where the substrate is transported by the sample holder between the LSP and EPCS measurements. This can be particularly useful when the stress profile is non-constant along the substrate, for example, if the substrate is curved in one or more directions. In another set of embodiments, as shown in FIGS. 8-12, the combined apparatus can use a single coupling prism (and a single measurement location). Unless otherwise noted, a discussion of features of aspects of one apparatus can apply equally to corresponding features of any of the aspects of the disclosure. For example, identical part numbers throughout the disclosure can indicate that, in aspects, the identified features are identical to one another and that the discussion of the identified feature of one aspect, unless otherwise noted, can apply equally to the identified feature of any of the other aspects of the disclosure.

Figure 2:
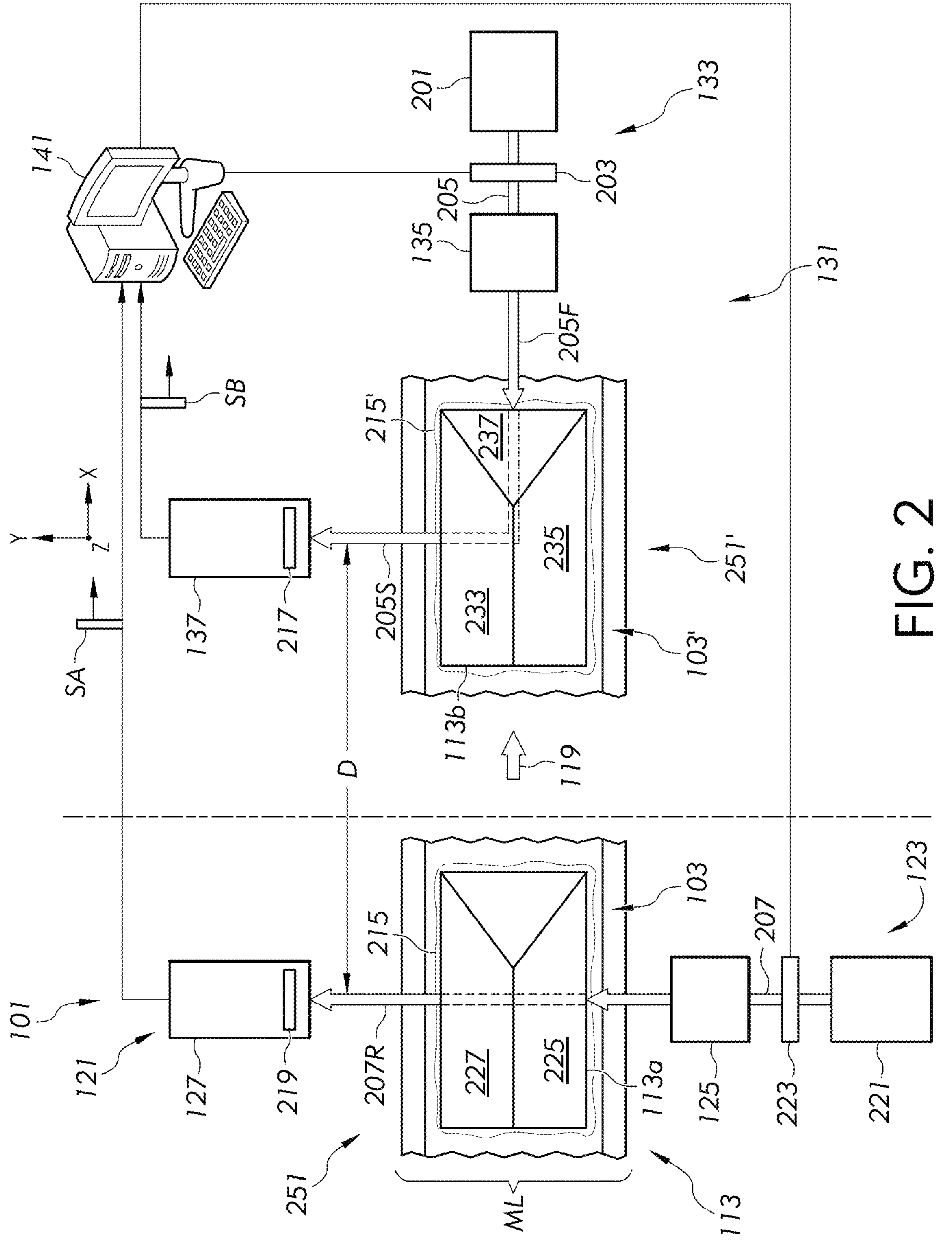
FIG. 2 is a schematic view of an example combined apparatus according to some aspects.
Figure 3:
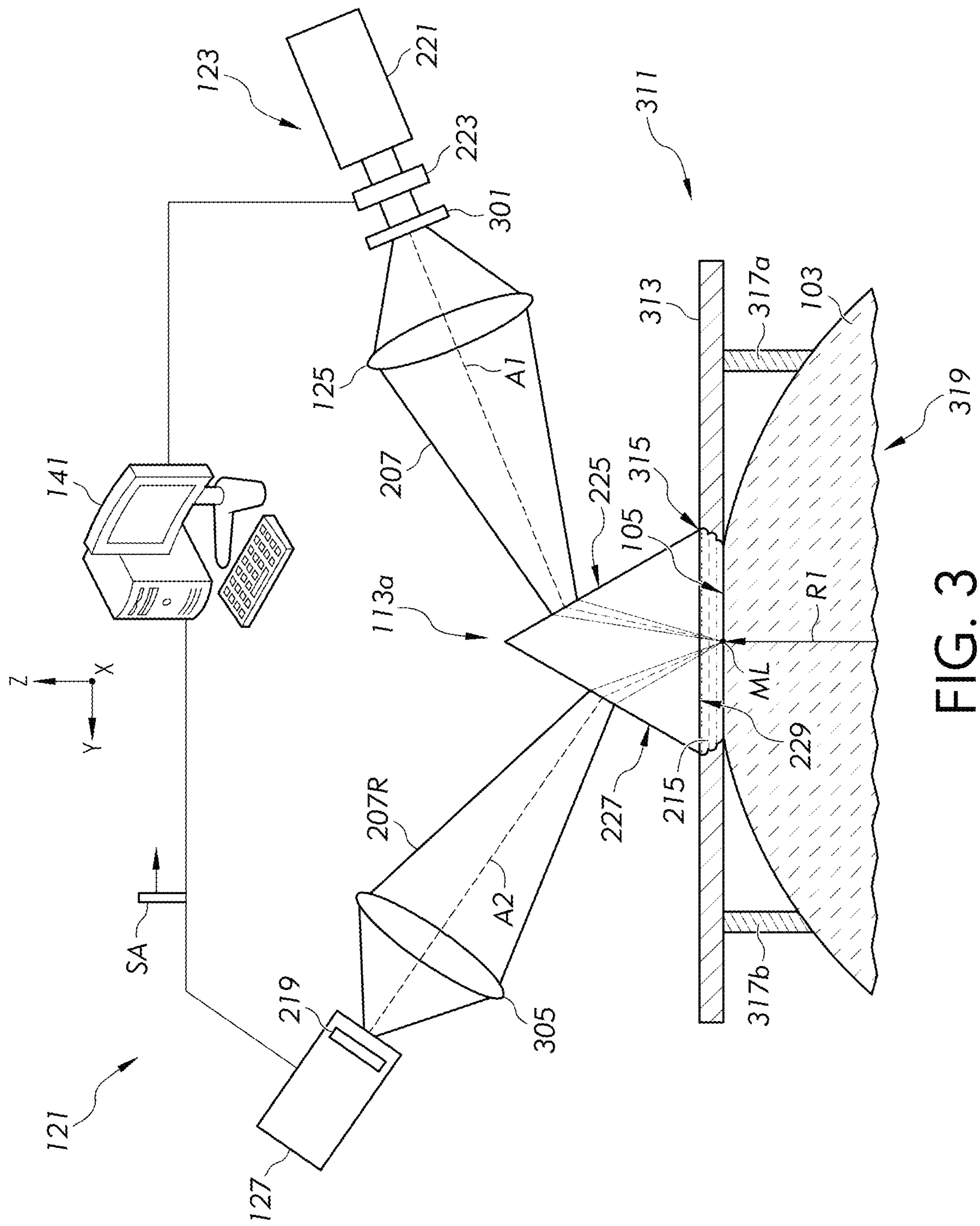
FIG. 3 is a schematic view of an example light-scattered polarimetry (LSP) apparatus according to some aspects.
Figure 4:
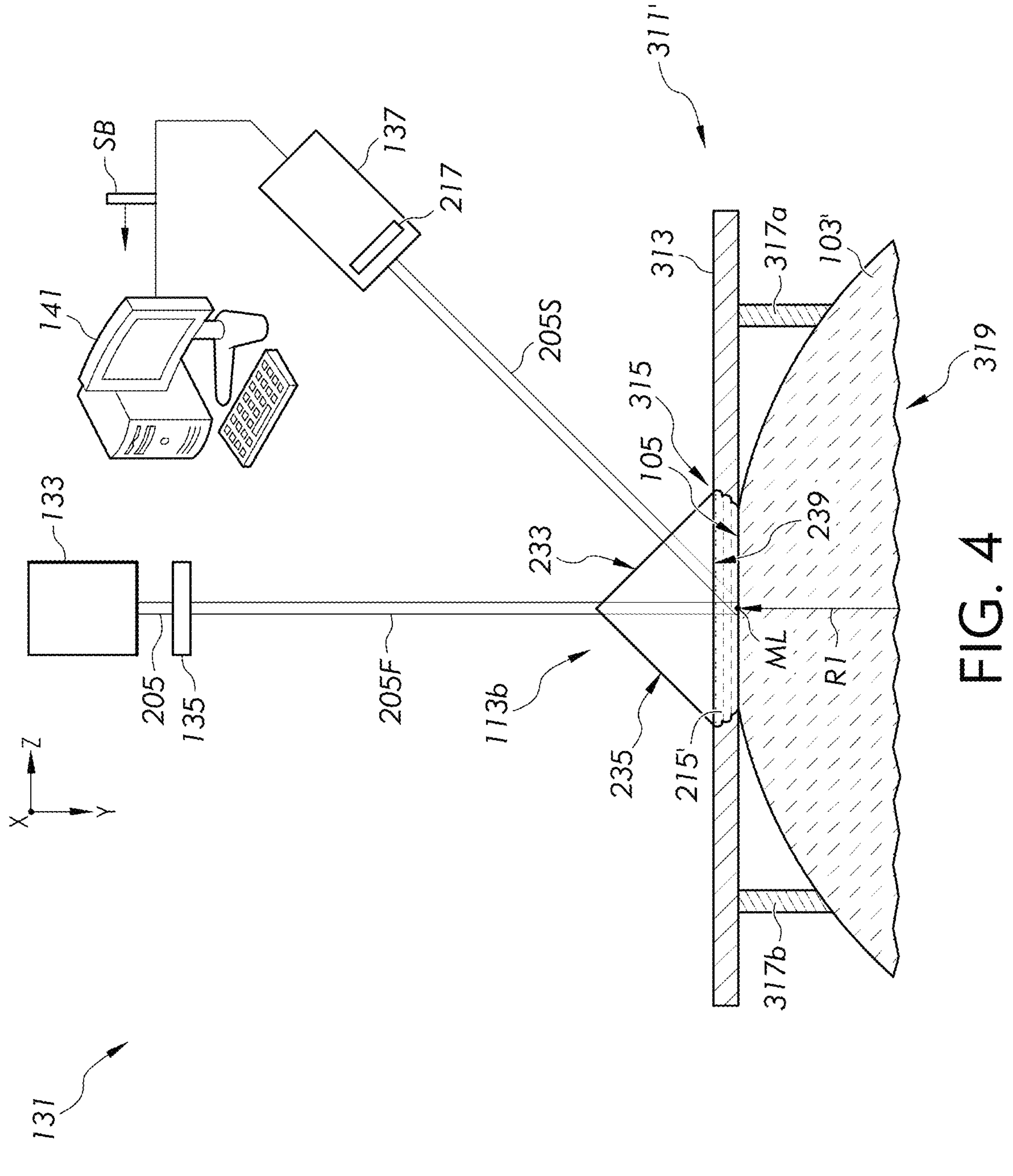
FIG. 4 is a schematic view of an example evanescent prism coupling (EPCS) apparatus according to some aspects.

FIGS. 1-6 and 8 schematically illustrate example aspects of combined apparatus in accordance with the aspects of the disclosure. The apparatus 101 shown in FIGS. 1-2 will now be discussed with an understanding that the description of components of the apparatus 101 are equally applicable to the apparatus 801 shown in FIG. 8 even though the orientation of the components is different, unless indicated otherwise. As shown in FIGS. 1-2, the apparatus can be an apparatus 101 comprising a light-scattering polarimeter (LSP) apparatus 131 and an evanescent prism coupling system (EPCS) apparatus 121. FIG. 3 shows a different view of the EPCS apparatus 121, and FIG. 4 shows a different view of the LSP apparatus 131.

FIGS. 1-2 schematically illustrate the apparatus 101 comprising a housing 107 enclosing the LSP apparatus 131 and the EPCS apparatus 121. In aspects, the housing 107 or other area of the apparatus 101 can comprise first dimension L1 and a second dimension L2 where components of the apparatus 101 are confined within an area defined by the first dimension L1 and the second dimension L2. In aspects, L1 and/or L2 can be in a range from about 200 mm to 1 meter, from about 200 mm to about 500 mm, from about 200 mm to about 300 mm, or any range or subrange therebetween. In aspects, although not shown, the controller 141 can be positioned outside of the housing 107.

As shown in FIGS. 1-2 and 4, the LSP apparatus 131 comprises a first polarization-switching light source 133. In aspects, as shown in FIG. 2, the first polarization-switching light source 133 comprises a first light source 201 and a first optical compensator 203. The first light source 201 can comprise a laser, a light-emitting diode (LED), and/or an organic light emitting diode. In further aspects, the laser can comprise a gas laser, an excimer laser, a dye laser, or a solid-state laser. Crystal-based lasers comprise a host crystal doped with a lanthanide, or a transition metal. Example aspects of host crystals include yttrium aluminum garnet (YAG), yttrium lithium fluoride (YLF), yttrium othoaluminate (YAL), yttrium scandium gallium garnet (YSSG), lithium aluminum hexafluoride (LiSAF), lithium calcium aluminum hexafluoride (LiCAF), zinc selenium (ZnSe), zinc sulfide (ZnS), ruby, forsterite, and sapphire. Example aspects of dopants include neodymium (Nd), titanium (Ti), chromium (Cr), cobalt (Co), iron (Fe), erbium (Er), holmium (Ho), thulium (Tm), ytterbium (Yb), dysprosium (Dy), cerium (Ce), gadolinium (Gd), samarium (Sm), and terbium (Tb). Example aspects of solid crystals include ruby, alexandrite, chromium fluoride, forsterite, lithium fluoride (LiF), sodium chloride (NaCl), potassium chloride (KCl), and rubidium chloride (RbCl). Laser diodes can comprise heterojunction or PIN diodes with three or more materials for the respective p-type, intrinsic, and n-type semiconductor layers. Example aspects of laser diodes include AlGaInP, AlGaAs, InGaN, InGaAs, InGaAsP, InGaAsN, InGaAsNSb, GaInP, GaAlAs, GaInAsSb, and lead (Pb) salts. Some laser diodes can represent exemplary aspects because of their size, tunable output power, and ability to operate at room temperature (i.e., from about 20° C. to about 25° C.) or a slightly elevated temperature (e.g., from about 35° C. to about 40° C.).

In aspects, the first light source 201 can be configured to emit a first light beam comprising a first optical wavelength. In further aspects, the first optical wavelength can be in a range from about 300 nanometers (nm) to about 1,000 nm, from about 350 nm to about 900 nm, from about 400 to about 800 nm, or any range or subrange therebetween. In even further aspects, the first wavelength can be about 365 nm, about 405 nm, about 415 nm, about 450 nm or more, about 510 nm, about 590 nm, about 650 nm, or about 780 nm. In aspects, the first light source 201 can be configured to selectively emit the first light beam comprising one of plurality of optical wavelengths, for example, by sequentially emitting different optical wavelengths from different component light sources of a plurality of light sources in the first light source. In aspects, the first polarization-switching light source 133 is configured to emit a first polarization-switched light beam along a first path 205 (e.g., portions 205F, 205S), as shown in FIGS. 2 and 4.

In aspects, the first optical compensator 203 can comprise a polarizing beam splitter. In further aspects, the first optical compensator 203 can comprise a half-wave plate and a quarter-wave plate. In even further aspects, one of the half-wave plate or the quarter-wave plate can be rotatable relative to the other, which can change the polarization of a light beam passing through it. In further aspects, the first optical compensator 203 can comprise an electronically controlled polarization modulator, for example, a liquid-crystal-based modulator or a ferroelectric liquid-crystal-based modulator. In further aspects, the first optical compensator 203 can be controlled by the controller 141 (discussed below).

As used herein, the first polarization-switching light source 133 (e.g., including the first optical compensator 203) is configured to cycle between two or more polarization states (polarizations). In aspects, the first polarization-switching light source 133 can be configured to switch between (e.g., cycle through) up to eight different polarizations that combine the linear, elliptical, and/or circular polarizations. In further aspects, the first polarization-switching light source 133 can be configured to go through a full polarization cycle (e.g., change between two or more polarizations) in a range from less than 1 second to about 10 seconds.

In aspects, as shown in FIG. 2, the LSP apparatus 131 can comprise a first focusing lens 135. As shown, the first focusing lens 135 can be positioned along the first path 205 of the first polarization-switched light beam. After passing through the first focusing lens 135, the first polarization-switched light beam can be focused along portion 205F of the first path 205. The first focusing lens 135 can comprise a convex lens and/or an adjustable focal length lens. In aspects, the first focusing lens 135 can be configured to collimate the first polarization-switched light beam along portion 205F of the first path 205. In aspects, although not shown, a bandpass filter, additional focusing lenses, a light diffuser, a beam splitter, and/or an attenuator can be positioned along portions 205F and/or 205S of the first path 205. In further aspects, one or more of these additional elements can be controlled by the controller 141.

In aspects, as shown in FIGS. 1 and 3-5, the LSP apparatus 131 comprises a coupling prism 113 (e.g., second coupling prism 113*b*). As discussed above, in some aspects, the coupling prism 113 of the apparatus 101 can comprise two prisms, for example, a first coupling prism 113*a* associated with the EPCS apparatus 121 and a second coupling prism 113*b* associated with the LSP apparatus 131. Consequently, the coupling prism 113 will be discussed with reference to the second coupling prism 113*b* when discussing the LSP apparatus 131 for simplicity with the understanding that a unitary prism could be used as the coupling prism in other aspects. In further aspects, as shown in FIG. 2, the second coupling prism 113*b* comprises an input surface 237 and an output surface 233. In further aspects, as shown in FIG. 2, the input surface 237 can comprise an end face of the prism. Although not shown, the portion 205F of the first path 205 can impinge the input surface 237 at an inclination that is substantially normal to the input surface 237. In further aspects, as shown in FIGS. 2 and 4, the second coupling prism 113*b* comprises a second surface 235 opposite the output surface 233. In further aspects, as shown in FIG. 4, the second coupling prism 113*b* comprises a coupling surface 239. In even further aspects, the coupling surface 239 of the second coupling prism 113*b* can face a coupling liquid 215 or 215'. In still further aspects, the coupling surface 239 of the second coupling prism 113*b* can contact the coupling liquid 215 or 215'. In further aspects, as shown in FIG. 4, the output surface 233, the second surface 235, and the coupling surface 239 can defined a triangular (e.g., equilateral triangle) cross-section of the second coupling prism 113*b*.

As shown in FIGS. 1-2 and 4, the LSP apparatus 131 can comprise a first detector 137. In aspects, the first detector 137 can comprise a digital camera, a CCD, and/or an array of photodetectors. In aspects, the first detector may comprise one or more focusing lenses, although an attenuator and/or a beam splitter can be provided in addition or alternatively in other aspects. In aspects, as shown in FIGS. 2 and 4, the first detector 137 can comprise an image sensor 217. In further aspects, the image sensor 217 can comprise an array of imaging pixels, which can be arranged in a two-dimensional array. In even further aspects, a maximum dimension of a pixel of the array of imaging pixels can be in a range from about 1 micrometer (μm) to about 15 μm, from about 2 μm to about 10 μm, from about 5 μm to about 8 μm, or any range or subrange therebetween. In further aspects, as shown in FIGS. 2 and 4, the first detector 137 can face the output surface 233 of the second coupling prism 113*b*. In further aspects, the first detector 137 can be positioned along the portion 205S of the first path 205 to detect a signal from the scattered first polarization-switched light beam that traveled through the second coupling prism 113*b*. As shown in FIGS. 1-2 and 4, the first detector 137 can be connected to the controller 141 by a communication path configured to transmit a signal SB. It is to be understood that another detector can face the second surface of the first coupling prism to detect another portion of the scattered first polarization-switched light beam that traveled through the first coupling prism, and/or an angle between the first detector, the first coupling prism, and the second detector can be substantially a right angle (e.g., in a range from about 85° to about 95°), which can enable multiple measurements to be captured in the same polarization that can be combined (e.g., averaged) to decrease noise in the measurement and/or reduce the time needed to take the corresponding measurement.

In aspects, as shown in FIG. 4, the LSP apparatus 131 can be configured to interface with a sample (e.g., substrate) positioned in a cavity 319 of a sample holder 311 or 311'. As discussed below, the sample holder 311 or 311' can at least partially define the cavity 319 configured to receive a substrate 103 (e.g., sample). In further aspects, the sample holder 311 or 311' can comprise a viewing aperture 315 configured to enable the first polarization-switched light beam to pass therethrough between the second coupling prism 113*b* (and/or the coupling liquid 215) and the substrate 103 (e.g., measurement location ML, cavity 319). As shown, the viewing aperture 315 can be defined by a platform 313 of the sample holder 311 or 311'. In further aspects, as shown, the substrate 103 can be a curved substrate and the sample holder 311 or 311' can comprise one or more supports 317*a* and 317*b* configured to support a first major surface 105 of the substrate 103, restrain movement of the substrate in one or more directions, and/or support a curvature of the curved substrate. However, it is to be understood that the apparatus 101 can also be used to measure stress-related characteristics of a planar substrate (e.g., see FIG. 8). In further aspects, as shown in FIGS. 1-2, the sample holder 251 or 251' can be translatable in a direction 119 (e.g., x-direction), for example to translate between a first configuration aligned with the first coupling prism 113*a* and a second configuration aligned with the second coupling prism 113*b*. Sample holder 251 or 251' can be configured to receive a planar substrate and/or a curved substrate. To illustrate the complexities associated with measuring a curved substrate, sample holder 311 will be shown in FIGS. 3-6 with the understanding that the sample holder 251 or 251' could comprise the sample holder 311 and/or the at a sample holder configured to receive a planar substrate can be used in place of sample holder 311.

In aspects, as shown in FIG. 4, the LSP apparatus 131 can be configured so that the first path 205 of the first polarization-switched light beam impinges on the input surface 237 of the second coupling prism 113*b*. In further aspects, the second coupling prism 113*b* can be positioned between the first polarization-switching light source 133 and the viewing aperture 315 of the sample holder 311 or 311' or the substrate 103. In further aspects, the second coupling prism 113*b* is positioned between the first polarization-switching light source 133 and the sample holder 311 or 311'. In further aspects, the first path 205 can be configured to impinge the input surface 237 of the second coupling prism 113*b* at a substantially normal angle of incidence (e.g., in a range from about 85° to about 95° relative to the input surface 237). In further aspects, as discussed above and as shown in FIG. 4, the first path 205 can impinge the viewing aperture 315 of the sample holder 311 or 311' or the substrate 103 before impinging one or more of the output surface 233 of the prism. In even further aspects, as shown, the LSP apparatus 131 can comprise one or more detectors configured to detect a signal from the first polarization-switched light beam.

As shown in FIGS. 1-3, the EPCS apparatus 121 can comprise a second polarization-switching light source 123. In aspects, as shown in FIGS. 2-3, the second polarization-switching light source 123 can comprise a second light source 221. In further aspects, the second light source 221 can comprise one or more of the light sources discussed above with regards to the first light source 201. In further aspects, the second polarization-switching light source 123 can be configured to emit a second polarization-switched light beam along a second path 207 (e.g., portion 207R). In aspects, the second polarization-switching light source 123 can comprise a second optical compensator 223, which can comprise one or more of the optical compensators discussed above with regards to the first optical compensator 203. In aspects, as shown in FIGS. 2-3, the EPCS apparatus 121 can comprise a converging lens 125. In further aspects, as shown in FIG. 3, the converging lens 125 can be configured to focus the second polarization-switched light beam passing through the converging lens 125 to form a focal point at an interface between the first major surface 105 of the substrate 103 and coupling liquid 215 (e.g., measurement location ML) and/or within the viewing aperture 315. In aspects, although not shown, one or more of the optical elements discussed with regards to the first focusing lens 135 (e.g., bandpass filter, additional focusing lenses, a light diffuser, a beam splitter, an attenuator) can be positioned along a portion of the second path 207. In further aspects, one or more of these additional elements can be controlled by the controller 141. For example, in even further aspects, as shown in FIG. 3, a mask 301 (or diverging optics) may be used in combination with the converging lens 125 so that a portion of a cone of light can pass therethrough and focus at the measurement location ML. In even further aspects, the mask 301 may be configured to allow a portion of a circular cross-section of an outer periphery of the second polarization-switched light beam to pass through the mask 301 to focus at the measurement location ML. In even further aspects, the mask 301 can be configured to allow a few rays of light to pass through the mask 301 to focus at the measurement location ML.

In aspects, as shown in FIGS. 1-3, the EPCS apparatus 121 comprises a coupling prism 113 (e.g., first coupling prism 113*a*). As discussed above, in some aspects, the coupling prism 113 of the apparatus 101 can comprise two prisms. Consequently, the coupling prism 113 will be discussed with reference to the first coupling prism 113*a* when discussing the EPCS apparatus 121 for simplicity with the understanding that a unitary prism could be used as the coupling prism in other aspects. In further aspects, as shown in FIGS. 2-3, the first coupling prism 113*a* comprises an input surface 225 and an output surface 227 that can be opposite the input surface 225. As shown in FIG. 3, the second path 207 can impinge the input surface 225 at an inclination that is substantially normal to the input surface 225. In further aspects, as shown in FIG. 3, the first coupling prism 113*a* comprises a coupling surface 229. In even further aspects, the coupling surface 229 of the first coupling prism 113*a* can face the coupling liquid 215. In still further aspects, the coupling surface 229 of the first coupling prism 113*a* can contact the coupling liquid 215. In further aspects, as shown in FIG. 3, the output surface 227, the input surface 225, and the coupling surface 229 can defined a triangular (e.g., equilateral triangle) cross-section of the first coupling prism 113*a*.

In aspects, the first coupling prism 113*a* can be substantially the same as and/or identical to the second coupling prism 113*b*. In aspects, as shown in FIG. 2, the first coupling prism 113*a* can omit the end face of the second coupling prism 113*b*. As shown in FIGS. 2-3, the first coupling prism 113*a* can comprise an input surface 225 and an output surface 227. In aspects, the input surface 225 can face the second light source 221, and the second path 207 therebetween can extend along a first axis A1. In aspects, the output surface 227 can face the second detector 127, and the portion 207R of the second path therebetween can extend along a second axis A2. In aspects, the second path 207 and/or the first axis A1 can impinge the input surface 225 at an inclination that is substantially normal to the input surface 225. In aspects, the portion 207R of the second path and/or the second axis A2 can impinge the output surface 227 at an inclination that is substantially normal to the output surface 227. As shown in FIG. 3, the first coupling prism 113*a* further comprises a coupling surface 229. The coupling surface 229 of the first coupling prism 113*a* can face the coupling liquid 215. In further aspects, the coupling surface 229 of the first coupling prism 113*a* can contact the coupling liquid 215. In further aspects, the output surface 227, the input surface 225, and the coupling surface 229 can defined a triangular (e.g., equilateral triangle) cross-section of the first coupling prism 113*a*.

In aspects, the coupling prism 113 and/or the first coupling prism 113*a* can comprise a first refractive. Throughout the disclosure, with reference to the coupling prism(s) and the coupling liquid, a refractive index is measured in accordance with ASTM E1967-19 using light comprising an optical wavelength of 589 nm. In aspects, the first refractive index of the first coupling prism 113*a* and/or the second coupling prism 113*b* may be about 1.3 or more, about 1.4 or more, about 1.45 or more, about 1.5 or more, about 1.7 or less, 1.6 or less, about 1.55 or less, or about 1.5 or less. In aspects, the first refractive index of the first coupling prism 113*a* and/or the second coupling prism 113*b* can be in a range from about 1.3 to about 1.7, from about 1.4 to about 1.6 from about 1.45 to about 1.55, from about 1.5 to about 1.55, or any range or subrange therebetween.

In aspects, as schematically shown in FIG. 3, the EPCS apparatus 121 can comprise the coupling liquid 215. In further aspects, as shown, the coupling liquid 215 can contact the first coupling prism 113*a*. In further aspects, the coupling liquid 215 can comprise a third refractive index that can be greater than, less than, or equal to the first refractive index. In further aspects, a differential equal to the absolute value between the third refractive index and the first refractive index can be in a range from about 0.05 or more, about 0.06 or more, about 0.08 or more, about 0.10 or more, about 0.12 or more, or about 0.14 or more. In further aspects, a differential equal to the absolute value between the third refractive index and the first refractive index can be in a range from about 0.05 to about 0.20, from about 0.04 to about 0.18, from about 0.06 to about 0.15, from about 0.08 to about 0.10, or any range or subrange therebetween. In further aspects, as shown, the coupling liquid 215 can be positioned between the first coupling prism 113*a* and the cavity 319 configured to the receive the substrate 103. In further aspects, as shown, the coupling liquid 215 can contact the sample holder 311, be positioned within the viewing aperture 315, and/or contact the first major surface 105 of the substrate 103. In aspects, although not shown, the coupling liquid 215 may not extend past the first coupling prism 113*a* in the x-direction. In aspects, although not shown, the coupling liquid 215 may not extend past the first coupling prism 113*a* in the z-direction. In aspects, as shown, the coupling liquid may not extend past the first coupling prism 113*a* in the y-direction.

As shown in FIGS. 1-3, the EPCS apparatus 121 can comprise a second detector 127. In aspects, the second detector 127 can comprise a digital camera, a CCD, and/or an array of photodetectors. In aspects, the second detector 127 may comprise one or more focusing lenses 305, an attenuator, and/or a beam splitter. In aspects, as shown in FIGS. 2-3, the second detector 127 can comprise an image sensor 219. In further aspects, although not shown, image sensor 219 can comprise similar or the same attributes as image sensor 217 discussed above. In further aspects, as shown in FIGS. 2-3, the second detector 127 can face the output surface 227 of the first coupling prism 113*a*. In further aspects, the second detector 127 can be positioned along the portion 207R of the second path 207 and/or the second axis A2 to detect a signal from the refracted second polarization-switched light beam that traveled through the first coupling prism 113*a*. As shown in FIGS. 1-3, the second detector 127 can be connected to the controller 141 by a communication path configured to transmit a signal SA.

In aspects, as shown in FIG. 3, the LSP apparatus 131 can be configured to interface with a sample (e.g., substrate) positioned in a sample holder 311. As discussed below, the sample holder 311 can at least partially define the cavity configured to receive a substrate 103 (e.g., sample). In further aspects, the sample holder 311 or 311' can comprise a viewing aperture 315 configured to enable the second polarization-switched light beam to pass therethrough between the first coupling prism 113*a* (and/or the coupling liquid 215) and the substrate 103 (e.g., measurement location ML). In further aspects, as shown, the substrate 103 can be a curved substrate and the sample holder 311 or 311' can comprise one or more supports 317*a* and 317*b* configured to support a first major surface 105 of the substrate 103, restrain movement of the substrate in one or more directions, and/or support a curvature of the curved substrate. However, it is to be understood that the apparatus 101 can also be used to measure stress-related characteristics of a planar substrate (e.g., see FIG. 8). In further aspects, as shown in FIGS. 1-2, the sample holder 251 or 251' can be translatable in a direction 119 (e.g., x-direction), for example to translate between a first configuration aligned with the first coupling prism 113*a* and a second configuration aligned with the second coupling prism 113*b*.

As used herein, the term "controller" can encompass all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them. In aspects, the controller can comprise and/or be implemented in digital electronic circuitry, or in computer software, firmware, or hardware, including the structures disclosed in this specification and their structural equivalents, or in combinations of one or more of them. Aspects of controllers described herein can be implemented as one or more computer program products (e.g., one or more modules of computer program instructions encoded on a tangible program carrier for execution by, or to control the operation of, data processing apparatus). The tangible program carrier can be a computer-readable medium. The computer-readable medium can be a machine-readable storage device, a machine-readable storage substrate, a memory device, or a combination of one or more of them. A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The processes described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit) to name a few. Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks.

However, a computer need not have such devices. Moreover, a computer can be embedded in another device, e.g., a mobile telephone, a personal digital assistant (PDA), to name just a few. Computer-readable media suitable for storing computer program instructions and data include all forms of data memory including nonvolatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry. To provide for interaction with a user, aspects described herein can be implemented on a computer having a display device, e.g., a CRT (cathode ray tube) or LCD (liquid crystal display) monitor, and the like for displaying information to the user and a keyboard and a pointing device, e.g., a mouse or a trackball, or a touch screen by which the user can provide input to the computer. Other kinds of devices can be used to provide for interaction with a user as well; for example, input from the user can be received in any form, including acoustic, speech, or tactile input. Aspects described herein can be implemented in a computing system that includes a back-end component, e.g., as a data server, or that includes a middleware component, e.g., an application server, or that includes a front-end component, e.g., a client computer having a graphical user interface or a Web browser through which a user can interact with implementations of the subject matter described herein, or any combination of one or more such back-end, middleware, or front-end components. The components of the system can be interconnected by any form or medium of digital data communication, e.g., a communication network. Aspects of communication networks include a local area network ("LAN") and a wide area network ("WAN"), e.g., the Internet. The computing system can include clients and servers. A client and server are generally remote from each other and typically interact through a communication network. The relationship of client and server arises from computer programs running on the respective computers and having a client-server relationship to each other.

The controller 141 can be configured to determine at least stress-related characteristic based on the signals SA and/or SB received from the LSP apparatus 131 and/or the EPCS apparatus 121. For example, the stress-related characteristic can include a stress profile, a knee stress, a center tension, a tension-strain energy, a birefringence, a spike depth, a depth of layer, a refractive index profile, or combinations thereof. In aspects, the substrate 103 can comprise a glass-based sample. As used herein, "glass-based" includes both glasses and glass-ceramics, wherein glass-ceramics have one or more crystalline phases and an amorphous, residual glass phase. Glass-based material cool or has already cooled into a glass, glass-ceramic, and/or that upon further processing becomes a glass-ceramic material. A glass-based material (e.g., glass-based substrate) may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion-exchange of larger ions for smaller ions in the surface of the substrate, as discussed below. However, other strengthening methods known in the art, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In one or more aspects, a glass-based material may comprise, in mole percent (mol %): $SiO_2$ in a range from about 40 mol % to about 80%, $Al_2O_3$ in a range from about 10 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali metal oxide, for example, $Li_2O$, $Na_2O$, $K_2O$, $Rb_2O$, and $Cs_2O$. As used herein, RO can refer to MgO, CaO, SrO, BaO, and ZnO. In aspects, a glass-based substrate may optionally further comprise in a range from 0 mol % to about 2 mol % of each of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$. "Glass-ceramics" include materials produced through controlled crystallization of glass. In aspects, glass-ceramics have about 1% to about 99% crystallinity. Examples of suitable glass-ceramics may include $Li_2O—Al_2O_3—SiO_2$ system (i.e. LAS-System) glass-ceramics, $MgO—Al_2O_3—SiO_2$ system (i.e. MAS-System) glass-ceramics, $ZnO \times Al_2O_3 \times nSiO_2$ (i.e. ZAS system), and/or glass-ceramics that include a predominant crystal phase including β-quartz solid solution, β-spodumene, cordierite, petalite, and/or lithium disilicate. The glass-ceramic substrates may be strengthened using the strengthening processes described herein. In one or more aspects, MAS-System glass-ceramic substrates may be strengthened in $Li_2SO_4$ molten salt, whereby an exchange of $2Li^+$ for $Mg^{2+}$ can occur. In aspects, the substrate comprising the glass-based substrate can be optically transparent. As used herein, "optically transparent" or "optically clear" means an average transmittance of 70% or more in the wavelength range of 400 nm to 700 nm through a 1.0 mm thick piece of a material. In aspects, an "optically transparent material" or an "optically clear material" may have an average transmittance of 75% or more, 80% or more, 85% or more, or 90% or more, 92% or more, 94% or more, 96% or more in the wavelength range of 400 nm to 700 nm through a 1.0 mm thick piece of the material. The average transmittance in the wavelength range of 400 nm to 700 nm is calculated by measuring the transmittance of whole number wavelengths from about 400 nm to about 700 nm and averaging the measurements.

Figure 7:
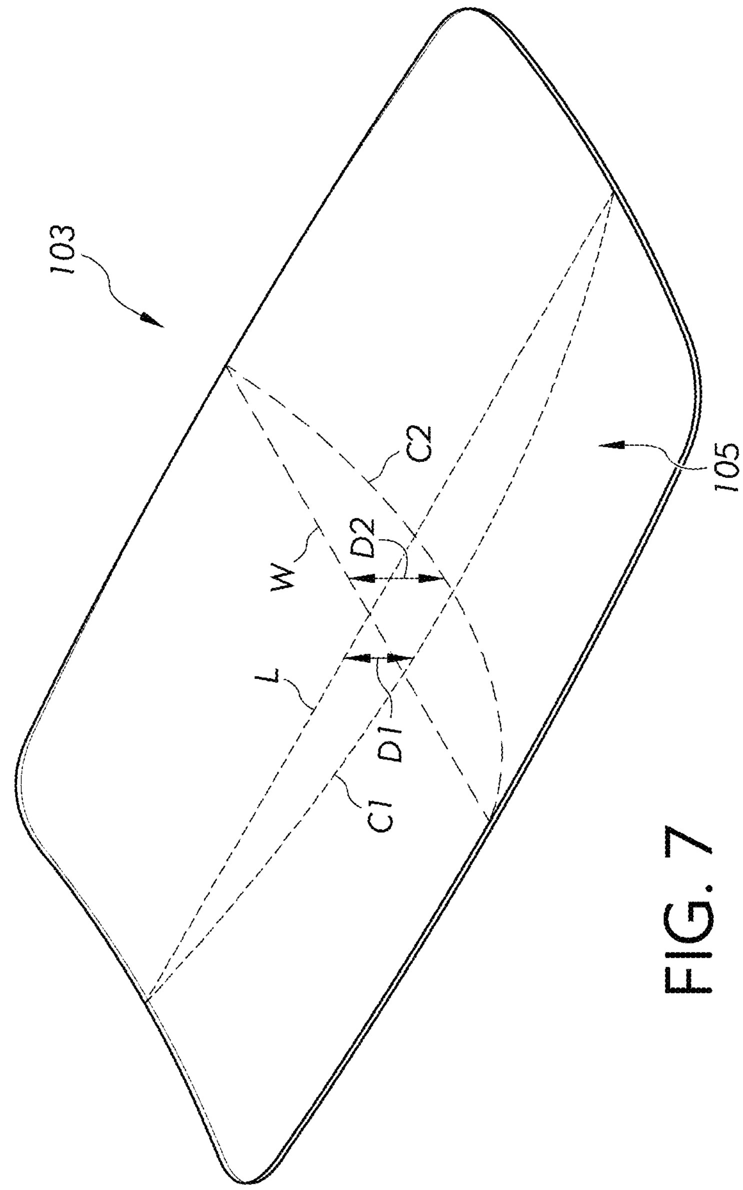
FIG. 7 is a perspective view of a curved substrate according to some aspects.

As shown in FIG. 7, the substrate 103 can comprise a length L and a width W perpendicular to the length. In aspects, the dimensions (e.g., length L, width W) of the sample may correspond to the dimension of a consumer electronic product. In aspects, the substrate 103 can comprise a consumer electronic product. The consumer electronic product can comprise a glass-based portion and further comprise electrical components at least partially within a housing. The electrical components can comprise a controller, a memory, and a display. A display can be at or adjacent the front surface of the housing. The consumer electronic product can comprise a cover substrate disposed over the display.

As shown in FIGS. 3-5, 7, and 13, the substrate 103 can be a curved substrate. As shown in FIGS. 3-4, the substrate 103 (e.g., curved substrate) can comprise at least one curvature characterized by a first radius of curvature R1. In aspects, the first radius of curvature R1 can be about 0.1 mm or more, about 0.2 mm or more, about 0.5 mm or more, about 1 mm or more, about 2 mm or more, about 5 mm or more, about 10 mm or more, about 50 mm or more, about 100 mm or more, about 1 meter or more, about 10 meters or less, about 1 meter or less, about 500 mm or less, about 200 mm or less, about 100 mm or less, about 50 mm or less, about 20 mm or less, about 10 mm, about 5 mm or less, or about 1 mm or less. In aspects, the first radius of curvature R1 can be in a range from about 0.1 mm to about 10 meters, from about 0.2 mm to about 1 meter, from about 0.5 mm to about 500 mm, from about 1 mm to about 200 mm, from about 2 mm to about 100 mm, from about 5 mm to about 50 mm, from about 10 mm to about 20 mm, or any range or subrange therebetween.

As shown in FIG. 7, the substrate 103 can be curved in more than one direction. For example, the substrate can comprise two orthogonal curvatures C1 and C2 that can each be characterized by a radius of curvature. In aspects, the two radii of curvatures can be the same. Alternatively, the two radii of curvature can be different (e.g., the substrate is complexly curved). In further aspects, the second radius of curvatures can be different (e.g., by 10% or more or 50% or more) from the first radius of curvature but within one or more of the ranges set forth above for the first radius of curvature. For example, as shown in FIG. 7, a first deflection D1 (from a plane defined by the outer periphery of the substrate 103) along the first curvature C1 can be different than an second deflection D2 (from a plane defined by the outer periphery of the substrate 103) along the second curvature C2.

Figure 13:
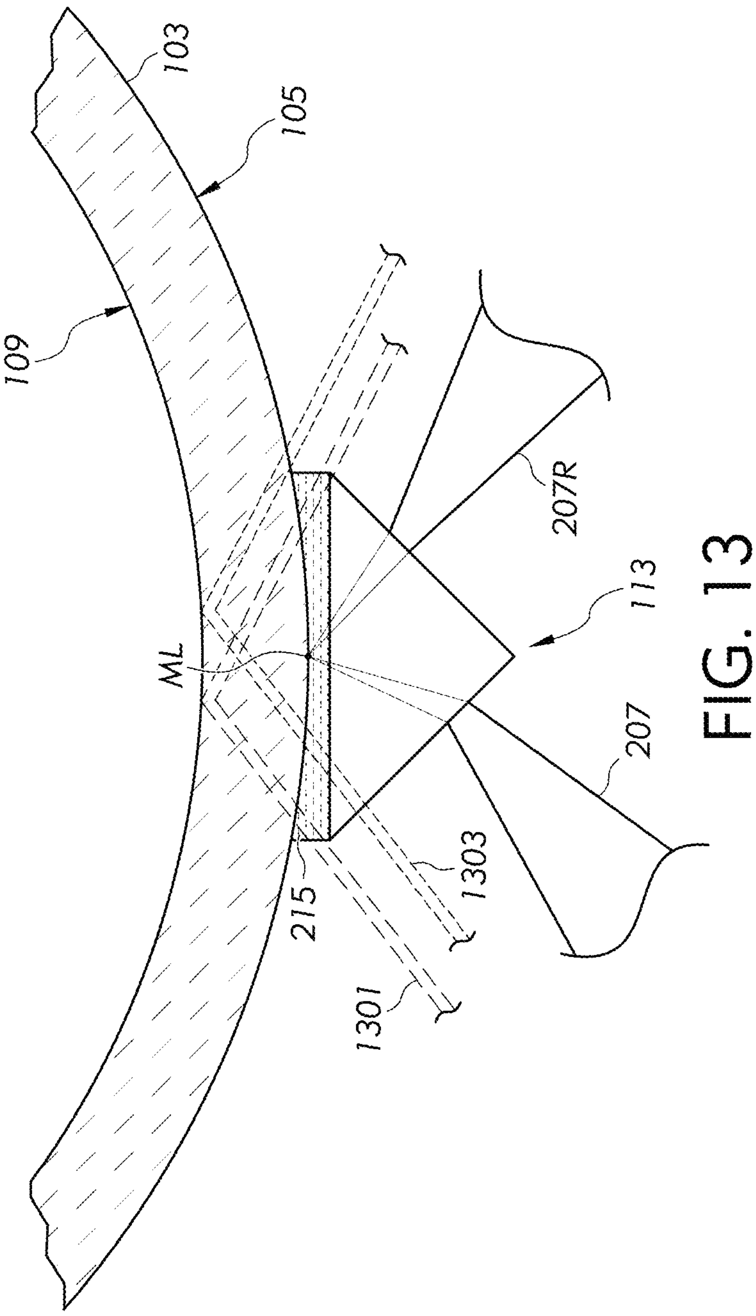
FIG. 13 is a schematic view of additional beams impinging the substrate according to some aspects.

As shown in FIG. 13, the substrate 103 can comprise a first major surface 105 and a second major surface 109 opposite the first major surface 105. In aspects, a thickness defined as an average distance therebetween can be about 20 μm or more, about 40 μm or more, about 100 μm or more, about 150 μm or more, about 200 μm or more, about 250 μm or more, about 500 μm or more, about 800 μm or more, about 1 mm or more, about 2 mm or more, about 5 mm or less, about 3 mm or less, about 2 mm or less, about 1 mm or less, about 500 μm or less, about 300 μm or less, about 200 μm or less, or about 100 μm or less. In aspects, the thickness can be in a range from 20 μm to 5 mm, from 40 μm to 3 mm, from 100 μm to 1 mm, from 150 μm to 500 μm, or any range or subrange therebetween. In aspects, the thickness can be substantially constant across the first major surface.

Figure 5:
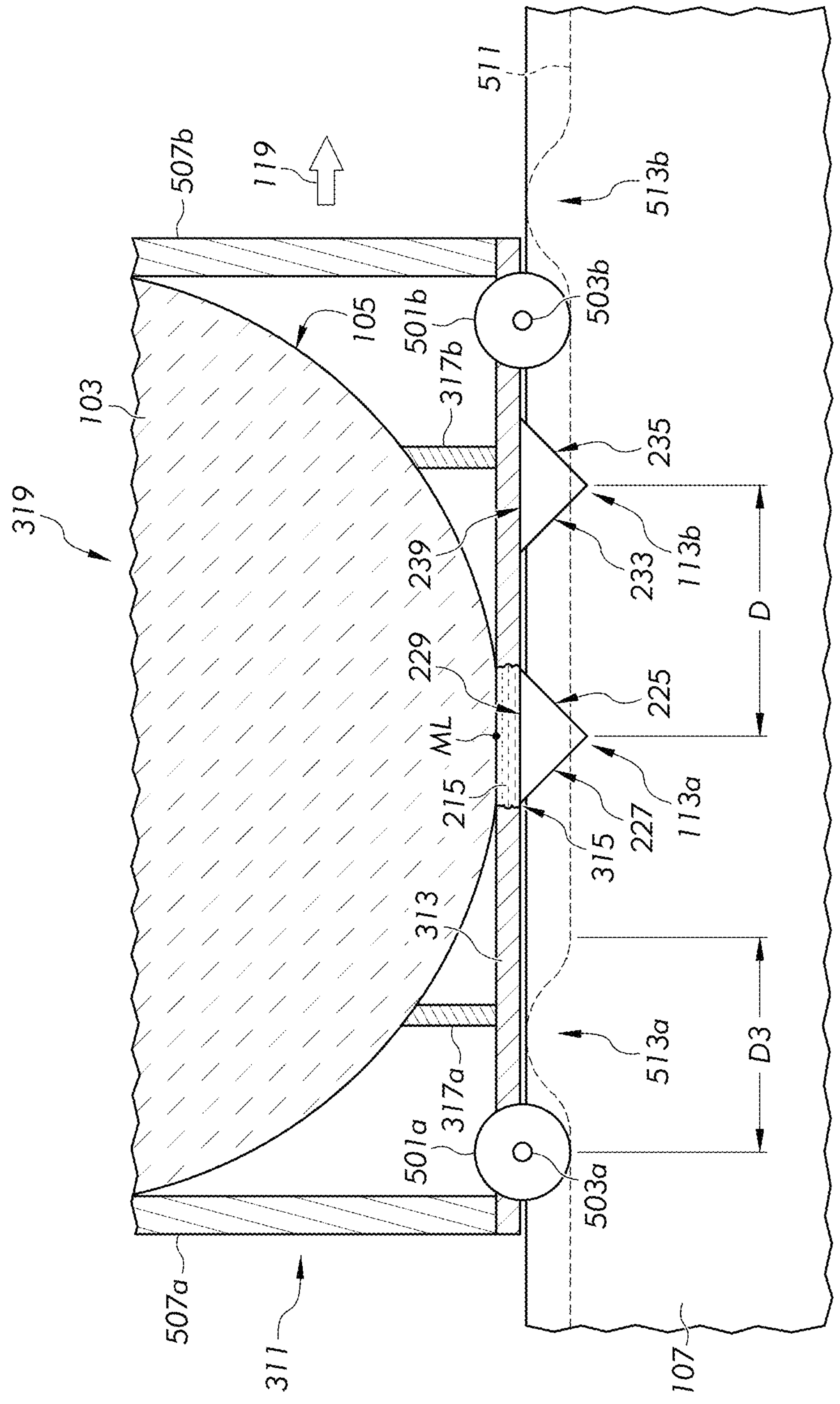
FIG. 5 is a schematic view of an example sample holder as part of the combined apparatus according to some aspects.
Figure 6:
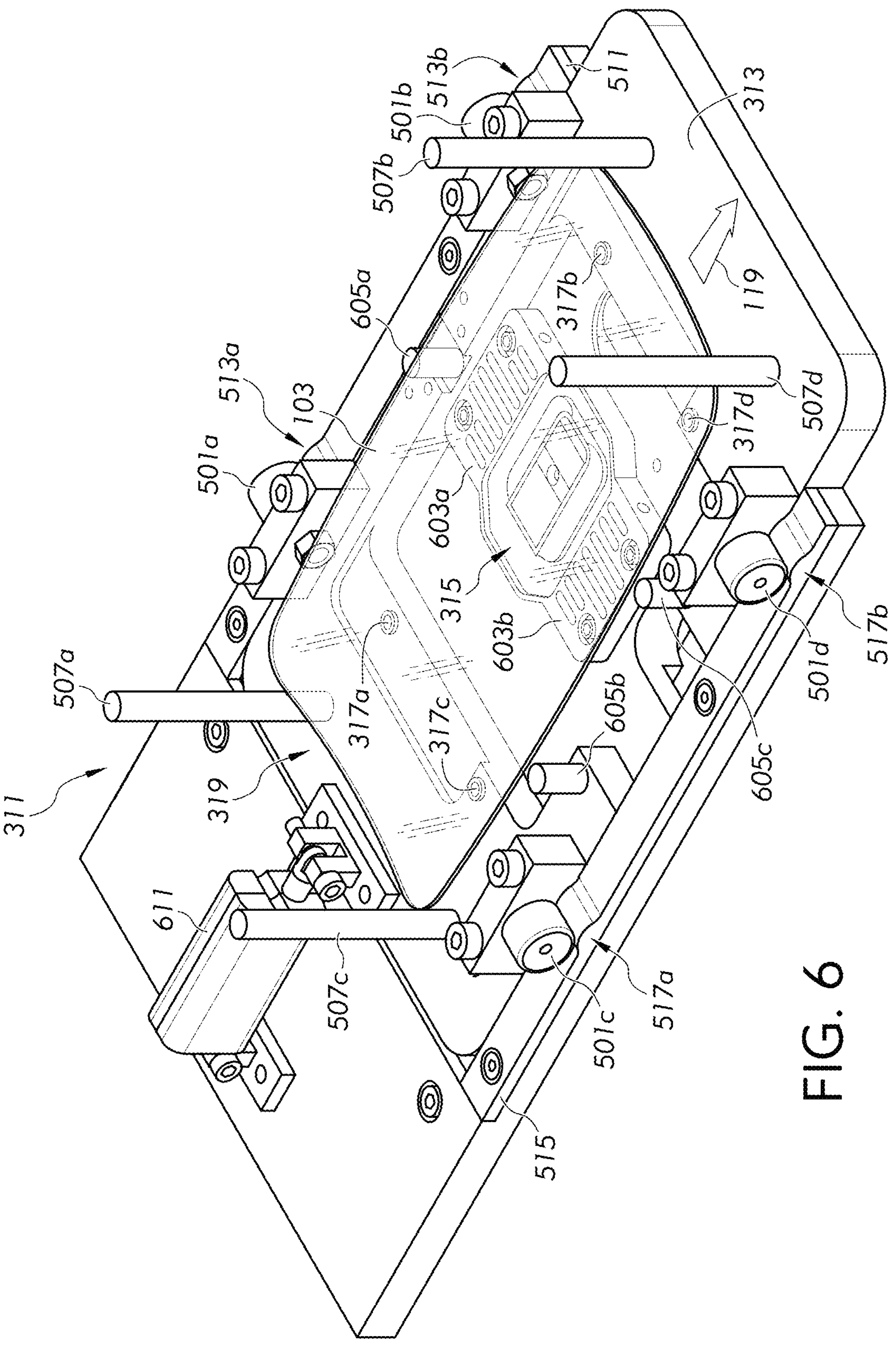
FIG. 6 is a perspective view of an example sample holder as part of the combined apparatus according to some aspects.

As discussed above and shown in FIGS. 3-6, the sample holder 311 comprises a cavity 319 configured to receive the substrate 103. Also, as discussed above and as shown, the sample holder 311 comprises a viewing aperture 315 configured to allow a measurement beam (e.g., first polarization-switched light beam and/or second polarization-switched light beam corresponding to measurement beam(s)) to travel between the cavity 319 and/or substrate 103 positioned therein and a location outside of the sample holder 311 (e.g., a corresponding coupling prism 113, 113*a*, and/or 113*b* depending on the configuration of the sample holder 311). In aspects, as shown, the sample holder 311 comprises a first set of supports (e.g., supports 507*a*, 507*b*, 507*c*, and/or 507*d*) configured to restrain movement of the substrate 103 (e.g., curved substrate) in a first direction (e.g., direction 119 in which the sample holder 311 is configured to translate). In aspects, as shown in FIG. 6, the sample holder 311 can comprise a second set of supports (e.g., supports 605*a*, 605*b*, and/or 605*c*) configured to restrain movement of the substrate 103 (e.g., curved substrate) in a second direction perpendicular to the first direction, which can be provided in addition to the first set of supports (as shown). In aspects, as shown in FIGS. 3-6, the sample holder 311 can further comprise a plurality of devices (e.g., supports 317*a* and/or 317*b* shown in FIGS. 3-5, supports 317*a*, 317*b*, 317*c*, and/or 317*d* shown in FIG. 6, and/or vacuum ports 603*a* and/or 603*b*) configured to hold a curvature of the substrate 103 (e.g., curved substrate) in a fixed configuration. As shown, the plurality of devices (e.g., supports 317*a* and 317*b* shown in FIGS. 3-5) configured to hold a curvature of the substrate 103 can be positioned within an area defined by the first set of supports (e.g., supports 507*a*, 507*b*, 507*c*, and/or 507*d*) and/or the a second set of supports (e.g., supports 605*a*, 605*b*, and/or 605*c*). In further aspects, as discussed above, the plurality of devices configured to hold a curvature of the substrate 103 can comprise supports 317*a*, 317*b*, 317*c*, and/or 317*d* (e.g., posts) configured to provide a supporting force to the substrate 103 (e.g., counteracting gravitational forces). Alternatively or additionally, in further aspects, the plurality of devices configured to hold a curvature of the substrate 103 can comprise a plurality of vacuum ports 603*a* and/or 603*b* configured to apply a vacuum (e.g., suction force) to the substrate 103. Providing the plurality of supports (e.g., first set, second set, devices) can prevent the substrate from adjusting (e.g., moving) when measuring the substrate. For example, the measurements and/or stress-related characteristics can vary across a surface of the substrate, and measurements taken from different locations on the substrate can lead to inaccurate measurements of stress-related characteristics. Curved substrates pose a particular problem both because (1) the measurements associated with stress-related characteristics can change over relatively short distances across the first major surface and (2) curved substrates are more prone to shifting, especially when moved, changing the location measured. The aspects of the present disclosure provide an apparatus to measure the same location on the substrate using a combined apparatus, where each sub-system (e.g., LSP and EPCS) can focus at physically different location, by securing and moving the substrate in the sample holder.

As discussed above, the sample holder 311 is configured to translate in the direction 119 (and/or in the opposite direction). As shown in FIGS. 1-2 and 5, the first coupling prism 113*a* and the second coupling prism 113*b* can be offset from one another by a distance D in the direction 119. Since the EPCS apparatus 121 is configured measure in the substrate 103 with the first coupling prism 113*a* (i.e., in a first configuration) and the LSP apparatus 131 is configured to measure the substrate 103' with the second coupling prism 113*b* (i.e., in a second configuration), the sample holder 311 is configured to translate between the first configuration (e.g., left of FIGS. 2 and 5 or top of FIG. 1) and the second configuration (e.g., right of FIGS. 2 and 5 or bottom of FIG. 1), as shown by the substrate 103 and 103', the coupling liquid 215 and 215', and the sample holder 251 and 251' in FIGS. 1-2. For example, the coupling liquid 215 applied in the first configuration (e.g., over the first coupling prism 113*a*) can be translated along with the substrate 103 and 103' by the sample holder 251 and 251' to the second configuration to be reused as coupling liquid 215'. In aspects, as shown in FIG. 6, a linear actuator 611 can be configured to translate the sample holder 311 between the first configuration and the second configuration (e.g., in the direction 119). Although shown as a stand-alone linear actuator, the linear actuator can be part of a robot with the sample holder as an end-effector of the robot or the end-effector of the robot configured to interface with sample holder.

As shown in FIG. 5, the first coupling prism 113*a* and the second coupling prism 113*b* (e.g., shown with the corresponding coupling surface 229 and 239 at an exterior of the housing 107) can be in a common plane. In aspects, as shown in FIGS. 5-6, the sample holder 311 can be configured to move the substrate 103 (e.g., curved substrate) away from the common plane (i.e., defined by coupling surfaces 229 and 239) as it translated in the direction 119. In further aspects, as shown in FIGS. 5-6, the sample holder 311 can be configured to translate along a track 511 and/or 515 comprising a raised portion 513*a*, 513*b*, 517*a*, and/or 517*b*. For example, as shown, the sample holder 311 can comprise a plurality of wheels 501*a*, 501*b*, 501*c*, and 501*d*. As shown in FIG. 5, the plurality of wheels 501*a*, 501*b*, 501*c*, and 501*d* can be attached to the sample holder and configured to rotate about a corresponding axis 503*a* and 503*b*. As shown in FIGS. 4-5, the plurality of wheels are 501*a*, 501*b*, 501*c*, and 501*d* configured to engage with and move along the track 511 and/or 515. In even further aspects, as shown in FIG. 5, the sample holder 311 can travel over the raised portion 513*a* and 513*b* as it translates between the first configuration (e.g., first coupling prism 113*a*) and the second configuration (e.g., second coupling prism 113*b*). As shown, the raised portions 513*a* and 513*b* can comprise a width D3, which can be substantially equal to or less than the distance D between the first configuration (e.g., first coupling prism 113*a*) and the second configuration (e.g., second coupling prism 113*b*). Alternatively, in further aspects, although not shown, the sample holder 311 move the substrate 103 (e.g., curved substrate) away from the common plane (i.e., defined by coupling surfaces 229 and 239) by lifting the sample holder 311 with a robot (e.g., end-effector). Moving the sample holder away from the common plane defined by the coupling prisms when translating therebetween can reduce a risk of damaging (e.g., scratching) the substrate 103 during the process.

Figure 8:
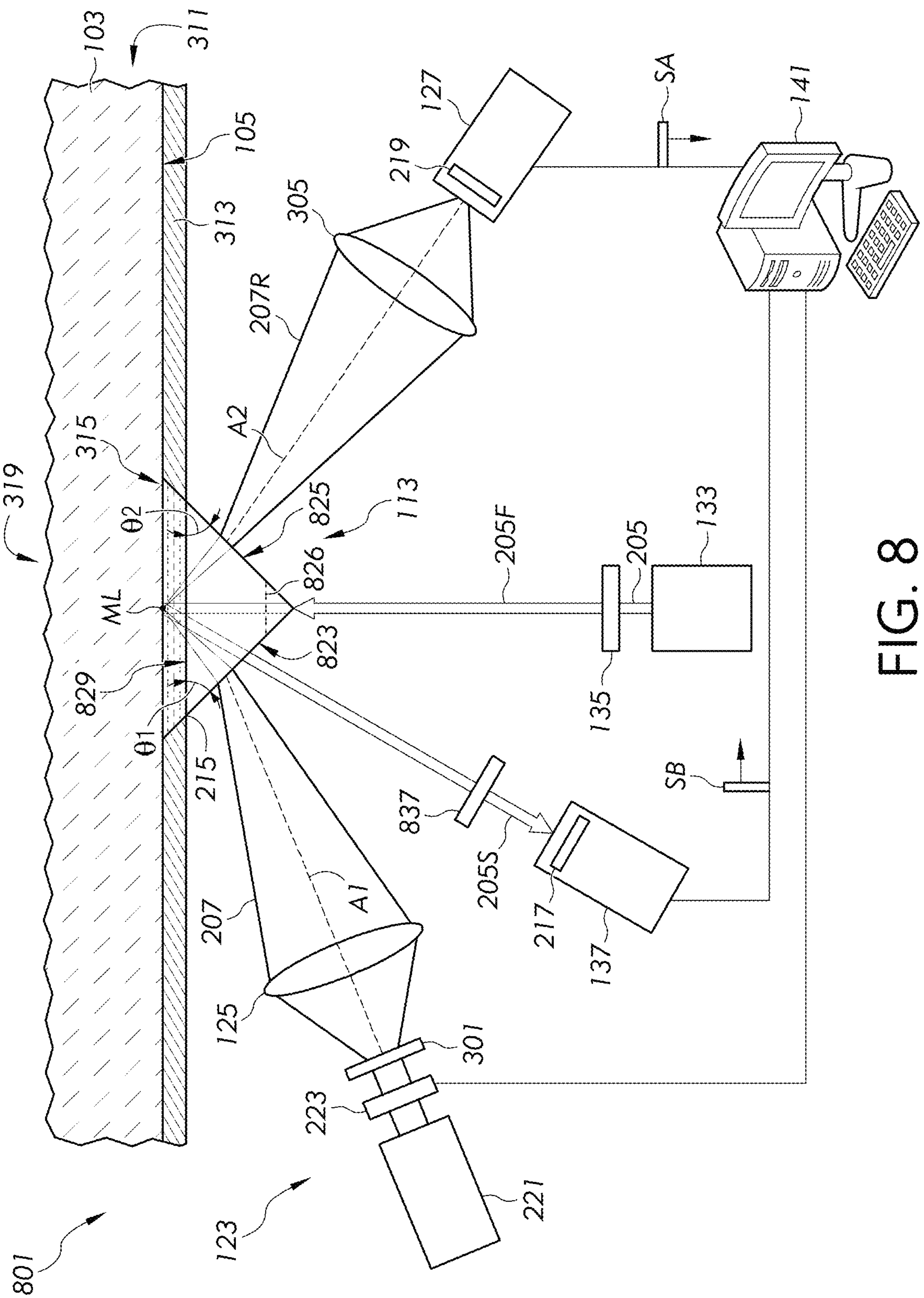
FIG. 8 is a schematic view of an example combined apparatus according using a single coupling prism to some aspects.

In another set of embodiments, as shown in FIGS. 8-12, both measurements (e.g., from the LSP apparatus and from the EPCS apparatus) can be performed using a single coupling prism 113 and with the corresponding beams focused on a single measurement location ML (e.g., simultaneously). The configuration shown in FIG. 8 is configured to only has at most one beam travelling in a given direction through each surface of the coupling prism 113 (other than the coupling surface 829, which is unavoidable) to avoid mixing or interference between the signals. Consequently, the configuration shown in FIG. 8 can enable simultaneous or near simultaneous measurement at a common measurement location ML with both parts of the apparatus 801 (e.g., from the LSP apparatus and from the EPCS apparatus). The aspects and variations discussed with reference to FIGS. 8-12 present alternatives that may increase signal fidelity (e.g., reduce depolarization of measurement beams), reduce costs, and/or facilitate physical orientation of the components in a reduced space.

As shown in FIG. 8, the apparatus 801 can include a sample holder 311 comprises a cavity 319 configured to receive the substrate 103. A planar surface (e.g., with the first major surface 105 extending along a plane) is shown since apparatus 801 (including sample holder 311) is generally applicable to making measurements on substrates of all shapes. However, it is to be understood that the sample holder 311 can be substantially similar to and/or identical to the sample holder described above with reference to FIG. 6 (e.g., configured to receive and support the curvature of a curved substrate) in other aspects. As shown, the sample holder 311 contains a viewing aperture 315 configured to allow measurement beams to travel therethrough, which can be in contact with and/or filled with the coupling liquid 215.

Although not labeled as such in FIG. 8, the EPCS apparatus can comprise the second light source 221, second optical compensator 223, and the converging lens 125 aligned along a first axis A1 as well as a focusing lens 305 and a second detector 127 with an image sensor 219 aligned along a second optical axis A2. The components of the LSP apparatus in FIG. 8 can be substantially the same and/or identical to those described above with reference to FIGS. 1-3. As shown, the second path 207 extending along the first optical axis A1 is configured to impinge a first surface 823 of the coupling prism 113 to focus on the measurement location ML. Also, the portion 207R of the second path is configured to impinge the second surface 825 of the coupling prism 113 so that a measurement beam can be detected by the second detector 127.

Although not labeled as such in FIG. 8, the LSP apparatus can comprise the first polarization-switching light source 133, the first focusing lens 135, and the first detector 137 including the image sensor 217. The components of the EPCS apparatus in FIG. 8 can be substantially the same and/or identical to those described above with reference to FIGS. 1-2 and 4. As shown, a first path 205 including portion 205F is configured to extend from the first polarization-switching light source 133 towards the measurement location ML. Although not visible in the plane shown in FIG. 8, the first path is configured to impinge an end face of the coupling prism (see input surface 237 of FIG. 2 with the understanding that FIG. 8 is a similar view to that shown in FIG. 4). Also, the portion 205S of the first beam is configured to impinge the first surface 823 of the coupling prism 113 so that a measurement beam can be detected by the first detector 137. In aspects, as shown, the EPCS apparatus can comprise a lens 837 with an adjustable focal length positioned between the coupling prism 113 (e.g., first surface 823) and the first detector 137.

As shown in FIG. 8, the coupling prism 113 is positioned such that the coupling surface 829 faces the viewing aperture 315. In aspects, the paths (e.g., first path 205 and second path 207) are configured to impinge substantially the same location on the viewing aperture 315, the cavity 319, and/or the substrate 103 (e.g., at the measurement location ML). The coupling prism 113 is positioned such that the end face (not shown in FIG. 8) faces the first polarization-switching light source 133. As shown in FIG. 8, the second surface 825 of the coupling prism 113 is configured to face the second detector 127. As shown in FIG. 8, the first surface 823 of the coupling prism 113 can face the second light source 221 and/or the first detector 137. Also, as shown, the first surface 823 of the coupling prism 113 is positioned such that a measurement beam traveling along the first optical axis A1 can impinge thereon going into the coupling prism 113 while at least a portion of another measurement beam travelling along the portion 205S of the first path is configured to impinge thereon going out of the coupling prism 113 towards the first detector 137. In aspects, to further avoid cross-talk or other interference between the measurement beams, the first polarization-switching light source 133 can be configured to emit a first measurement beam having a first wavelength than is different from a second wavelength of a second measurement beam that the second light source 221 is configured to emit.

Figure 9:
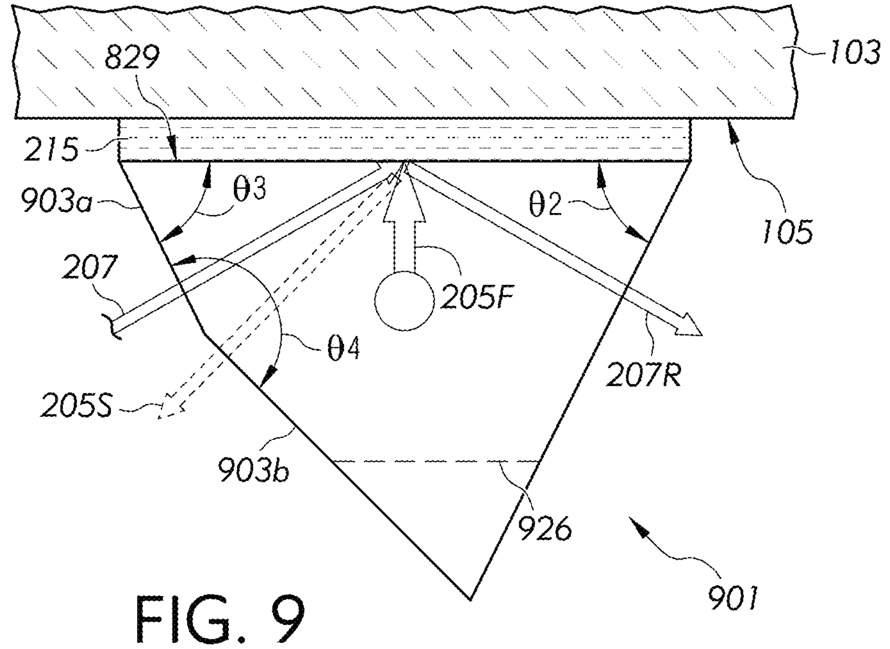
FIGS. 9-12 are schematic views of an example coupling prism as part of the combined apparatus according to some aspects.
Figure 10:
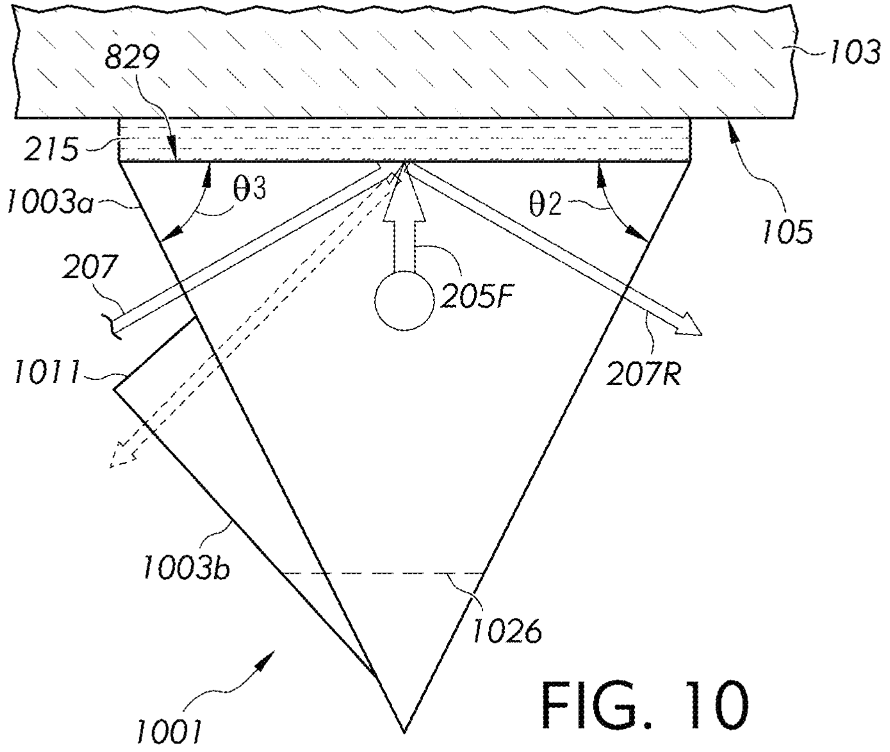
Figure 11:
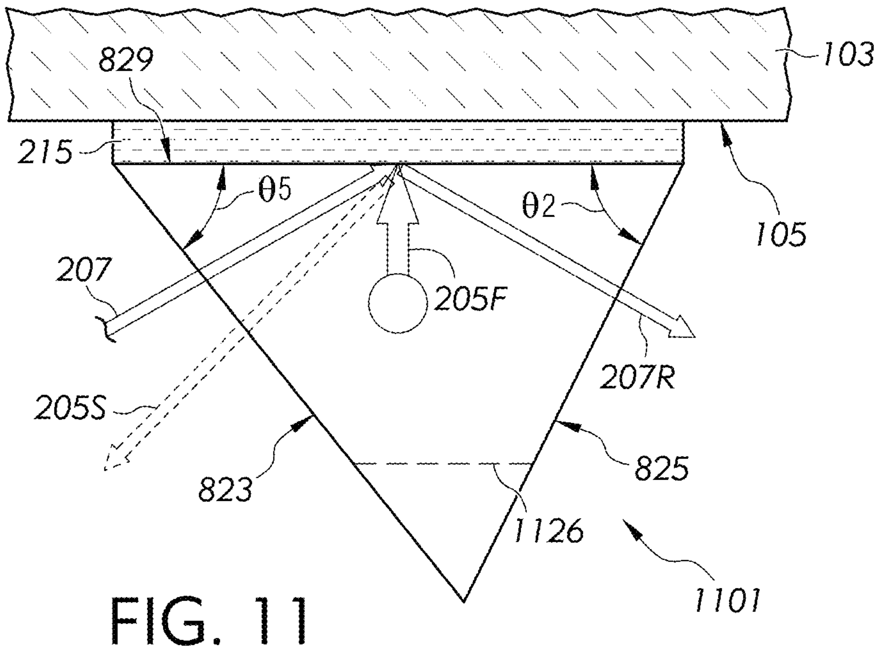
Figure 12:
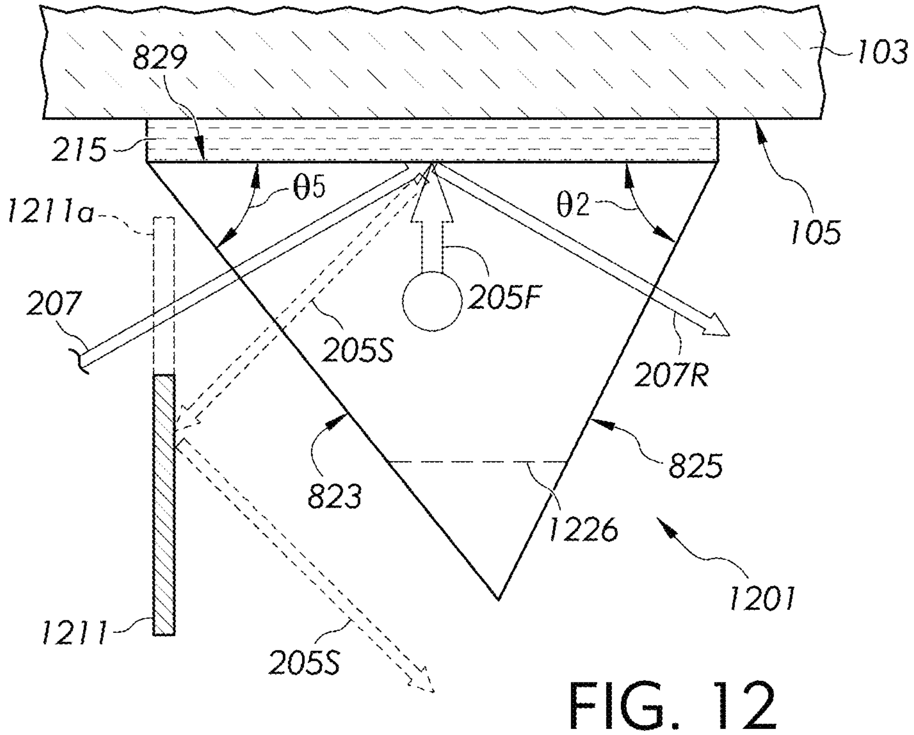

As shown in FIG. 8, the coupling surface 829 extends between the first surface 823 and the second surface 825. In aspects, as shown by the solid outline of the coupling prism 113, a cross-sectional shape of the coupling prism can be triangular as defined by an entire periphery of the a cross-section of the coupling prism 113 consisting of the coupling surface 829, the first surface 823, and the second surface 825. Alternatively, as shown in FIGS. 8 and 11-12 by the dashed line 826, 1126, or 1226, an apex of the coupling prism 113, 1101, or 1201 may be omitted such that a cross-sectional shape of the coupling prism 113 is trapezoidal as defined by a frustum surface (as indicated by dashed line 826), the coupling surface 829, the first surface 823, and the second surface 825. Similarly, as shown in FIGS. 9-10 by the dashed line 926 or 1026, an apex of the coupling prism 1001 may be omitted. Providing a frustum surface of the coupling prism (and/or omitting an apex of the coupling prism) can reduce costs associated with the coupling prism without impairing the function of the coupling prism. For example, the reduced costs for a given size of coupling prism can enable a larger coupling prism to be used, which can further separate the paths associated with the second light source 221 and the first detector 137.

As shown in FIG. 8, the prism can comprise a first internal angle θ1 defined between the first surface 823 and the coupling surface 829 as well as a second internal angle θ2 defined between the second surface 825 and the coupling surface 829. In aspects, the first internal angle θ1 and the second internal angle θ2 can be substantially the same and/or identical. For example, first internal angle θ1 and the second internal angle θ2 can both be equal to 60°, which can form a cross-sectional shape of an equilateral triangle. Alternatively, the first internal angle θ1 and the second internal angle θ2 can both be equal to some other value (e.g., from 50° to 75° or from 55° to 70°—excluding 60°), which can reduce signal depolarization or other issues associated with signal fidelity. In aspects, the first path 205 can be configured to impinge the end face of the coupling prism 113 at a substantially normal angle of incidence (e.g., in a range from about 85° to about 95° relative to the end surface). In aspects, the portion 207R of the second path can be configured to impinge the second surface 825 of the coupling prism 113 at a substantially normal angle of incidence (e.g., in a range from about 85° to about 95° relative to the second surface 825). In further aspects, the second internal angle θ2 can be configured to enable the portion 207R of the second path can be configured to impinge the second surface 825 of the coupling prism 113 at a substantially normal angle of incidence. In aspects, the second path 207 can be configured to impinge the first surface 823 of the coupling prism 113 at a substantially normal angle of incidence (e.g., in a range from about 85° to about 95° relative to the first surface 823), and/or the portion 205S of the first path can be configured to impinge the first surface 823 of the coupling prism 113 at a substantially normal angle of incidence (e.g., in a range from about 85° to about 95° relative to the first surface 823).

In aspects, it may not be possible to achieve a substantially normal angle of incidence relative to the first surface 823 for both the second path 207 and the portion 205S of the first path with a single surface. In further aspects, the first internal angle θ2 can be configured to minimize a difference in the angles of incidence for the second path 207 and the portion 205S of the first path. For example, as shown in FIG. 11, the first internal angle θ5 can be adjusted so that the deviation of each path (e.g., the second path 207 and the portion 205S of the first path) from a normal angle of incidence is about the same and collectively minimized. For example, instead of forming an equilateral cross-section as depicted in FIG. 8 (e.g., θ1=θ2=60°), first internal angle θ5 can be greater than 60° (e.g., from 65° to 80°, from 65° to 75°, from 68° to 72°, or any range or subrange therebetween). Consequently, in further aspects, the first internal angle θ1 or θ5 can be greater than the second internal angle θ2.

In aspects, as shown in FIGS. 9-10, substantially normal angles of incidence for both the second path 207 and the portion 205S of the first path can be achieved by modifying first surface (relative to FIG. 8) to provide a first portion 903*a* or 1003*a* and a second portion 903*b* or 1003*b* that are non-parallel. As shown, the second path 207 can be configured to impinge the first portion 903*a* or 1003*a* while the portion 205S of the first path can be configured to impinge the second portion 903*b* or 1003*b*. Consequently, the first portion 903*a* or 1003*a* can form a first internal angle θ3 with the coupling surface 829 that can have the same value as, be less than, or be greater than the value of the first internal angle θ1 discussed above with reference to FIG. 8. As shown in FIG. 9, a fourth internal angle θ4 can be defined between the first portion 903*a* and the second portion 903*b*. In further aspects, the fourth internal angle θ4 can be about 150° or more, about 152° or more, about 155° or more, about 157° or more, about 160° or more, about 162° or more, about 165° or more, about 170° or more, about 175° or less, about 172° or less, about 170° or less, about 168° or less, about 165° or less, about 160° or less, or about 155° or less. In further aspects, the fourth internal angle θ4 can be in a range from about 150° to about 175°, from about 152° to about 172°, from about 155° to about 170°, from about 157° to about 168°, from about 160° to about 165°, or any range or subrange therebetween. Although not shown as such, it is to be understood than an angle formed by the intersection of a plane extending along the first portion 1003*a* and another plane extending along the second portion 1003*b* could be within one or more of the above-mentioned ranges for the fourth internal angle θ4. In further aspects, as shown in FIG. 9, the first portion 903*a* and the second portion 903*b* can form a continuous surface (e.g., corresponding to the first surface 823 shown in FIG. 8), meaning that the portions meet at a common point and without any jumps along the surface (e.g., in a direction perpendicular to a surface of the portions). For example, the coupling prism 901 shown in FIG. 9 could be formed by removing a portion of the first surface to form the second portion. In contrast, as shown in FIG. 10, the coupling prism 1001 can comprise a discontinuous surface defined by the first portion 1003*a* and the second portion 1003*b*. For example, as shown, the second portion 1003*b* can be formed by attaching an auxiliary coupling prism 1011 to the prism body of the coupling prism 1001, although it is to be understood that the coupling prism 1001 could be formed as a unitary and/or monolithic body in other aspects. Providing two, non-parallel portions of a first surface of the coupling prism can enable both the second path 207 and the portion 205S of the first path to impinge respective portions at a substantially normal angles of incidence. Also, providing two, non-parallel portions of a first surface of the coupling prism can facilitate separation of the respective paths, which can facilitate physical arrangement of corresponding light source and detector (e.g., in a smaller physical footprint).

In addition to and/or as alternative to the various aspects of the coupling prisms 113, 901, 1001, 1101, and/or 1201 discussed above with reference to FIGS. 8-12, as shown in FIG. 12, the apparatus (e.g., apparatus 801) can further comprise a reflecting device 1211 facing the first surface 823 of the coupling prism 1201. In aspects, as shown, the reflecting device 1211 can be configured to reflect at leas a portion of a measurement beam travelling along the portion 205S of the first path with the understanding that the position of the first detector 137 (see FIG. 8) would be repositioned accordingly. In further aspects, as shown, reflecting device can optionally comprise portion 1211*a* that can be impinged by second path 207 yet allowing a measurement beam travelling along the second path 207 to pass therethrough. In aspects, the reflecting device can comprise a dichroic mirror and/or a beam splitter. For example, the reflecting device can reflect a first wavelength of light associated with a measurement beam travelling along the portion 205S of the first path but not reflect a second wavelength of light associated with a measurement beam travelling along the second path 207 (e.g., when the first wavelength and second wavelength are different). Additionally or alternatively, the reflecting device can reflect a measurement beam travelling from the coupling prism to the reflecting device (e.g., portion 205S of the second path) but allow a measurement beam travelling from the reflecting device towards the coupling prism (e.g., the second path 207) to pass therethrough. Providing the reflecting device can facilitate physical orientation of the components in a reduced space.

In aspects, as shown in FIG. 13, the apparatus can further comprise an additional beam source configure to impinge the substrate 103 with an additional beam configured to travel along path 1301 and/or 1303. As shown, there can be two additional beams configured to travel along path 1301 and 1303, but other numbers of additional beams can be provided in other aspects. In further aspects, as shown, the path 1301 may not impinge the coupling prism 113 nor the measurement location ML, although the path 1303 may impinge a portion of the coupling prism 113 without impinging the measurement location ML. Providing the addition beam (e.g., path) can enable an orientation of the substrate 103 to be more accurately determined. For example, the curved substrate shown in FIG. 13 could have multiple orientations that produce the same cross-sectional view (that might lead to different calculated stress-based characteristics based on the measurements) as determined solely by the measurement beams discussed previously impinging the measurement location ML (e.g., second path 207 including portion 207R shown in FIG. 13 with the understanding that the first path is also included but omitted from FIG. 13 for clarity). However, the path(s) 1301 and/or 1303 of additional beams can distinguish between such configurations that would otherwise appear identical (but lead to different calculated stress-based characteristics based on the measurements). Consequently, information about the additional beam(s) traveling along the path 1301 and/or 1303 can be used by the controller 141, which can be configured to adjust a calculation used to determine the at least one stress-based characteristic based on at least the path 1301 and/or 1303 travelled by the additional beam.

Aspects of methods of determining a stress-related characteristic (for example using the apparatus 101 of FIG. 1-7 or 13 and/or the apparatus 801 of FIG. 8-12) will not be discussed in accordance with the aspects of the disclosure.

In a first set of embodiments, as shown in FIG. 3-6, methods can comprise disposing the substrate 103 on the sample holder 311 (e.g., in the cavity 319) with the coupling liquid 215 disposed on the first major surface 105 of the substrate 103 facing the viewing aperture 315, for example, with the coupling liquid 215 positioned between the first major surface 105 of the substrate 103 and the coupling surface 229 or 239 of a corresponding coupling prism 113*a* or 113*b*. In aspects, as shown, the substrate 103 can comprise a curved substrate and the disposing the substrate in the sample holder 311 can support and/or hold a curvature of the substrate, for example using supports 317*a*, 317*b*, 317*c*, and/or 317*d* and/or applying a vacuum through vacuum ports 603*a* and/or 603*b*. In aspects, as shown, the sample holder 311 can restrain movement of the substrate in a first direction and/or a second direction perpendicular to the first direction using corresponding supports 507*a*, 507*b*, 507*c*, and/or 507*d* and/or 605*a*, 605*b*, and/or 605*c*. As shown in FIGS. 3 and 5, the sample holder 311 can be in a first configuration, where the viewing aperture 315 is aligned with the coupling surface 229 of the first coupling prism 113*a* (e.g., configured to perform a measurement using the EPCS apparatus 121. Alternatively, as shown in FIG. 4, the sample holder 311 can be in a first configuration, where the viewing aperture 315 is aligned with the coupling surface 239 of the second coupling prism 113*b* (e.g., configured to perform a measurement using the LSP apparatus 131). Consequently, it is to be understood that a measurement taken in the first configuration can correspond to a measurement using the EPCS apparatus or the LSP apparatus with another measurement taking in the second configuration can correspond to the other apparatus. For simplicity, the rest of this section will discuss the first configuration corresponding to the when the viewing aperture 315 is aligned with the coupling surface 229 of the first coupling prism 113*a* (e.g., configured to perform a measurement using the EPCS apparatus 121), and the second configuration corresponding to when the viewing aperture 315 is aligned with the coupling surface 239 of the second coupling prism 113*b* (e.g., configured to perform a measurement using the LSP apparatus 131). In aspects, as shown, a plane tangent to the first major surface 105 of the substrate 103 at the measurement location ML can be parallel to the coupling surface 229 of the first coupling prism 113*a*.

Then, as shown in FIGS. 2-3, aspects of methods can proceed to transmitting a first beam (e.g., along the second path 207) from a first beam source (e.g., second polarization-switching light source 123 that impinges the input surface 225 of the first coupling prism 113*a*, the coupling liquid 215, and the measurement location ML. As shown, methods can further comprise detecting at least a portion of the first beam (e.g., traveling along portion 207R of the second path) with the second detector 127 to generate signal SA. For example, the EPCS apparatus 121 and/or the signal SB can be used to determine a mode spectrum.

In aspects, as shown in FIGS. 2 and 5-6, methods can proceed to translating the sample holder 311 (e.g., substrate 103) in the direction 119 from the first configuration to the second configuration. In further aspects, direction 119 refers to a direction between the first coupling prism 113*a* and the second coupling prism 113*b* and/or may be in a plane defined by the corresponding coupling surfaces 229 and 239, and/or may In further aspects, the coupling liquid 215 can be retained on the first major surface 105 and/or with the sample holder 311 as it translates. As discussed above with reference to FIGS. 5-6, the sample holder 311 can be configured to move the substrate 103 away from a plane defined by the coupling prisms 113*a* and 113*b* during the translating, for example, by moving the sample holder along a track 511 or 513 with raised portions 513*a*, 513*b*, 517*a*, and/or 517*b* (e.g., between two coplanar track portions) positioned along the portion travelled during the translating.

Then, as shown in FIGS. 2 and 4, aspects of methods can proceed to transmitting a second beam (e.g., along the first path 205) from a second beam source (e.g., first polarization-switching light source 133 that impinges the input surface 237 of the second coupling prism 113*b*, the coupling liquid 215, and the measurement location ML. As shown, methods can further comprise detecting at least a portion of the second beam (e.g., traveling along portion 205S of the first path) with the first detector 137 to generate signal SB, which can be transmitted as signal SB to the controller 141. The LSP apparatus 131 can measure a retardation profile of the substrate 103, which can be transmitted as signal SA to the controller 141. As used herein, the retardation profile means an amount of optical retardation of the signal as a function of the depth that the first polarization-switched light beam traveled into the substrate 103. As used herein, the optical retardation means a phase shift between two orthogonal light polarizations, which can be measured in radians (rad) or nanometers (nm). Without wishing to be bound by theory, the amount of optical retardation can be determined from the detected signal, which varies due to the constructive and destructive interference for the different effective path lengths of the detected signal through the sample. Without wishing to be bound by theory, stress in the sample can cause optical retardation along the first path of the first polarization-switched light beam, with the amount of stress encountered being proportional to the derivative of the optical retardation.

Based on the signal SA and/or SB received by the controller 141, the controller can calculate at least one stress-related characteristic of the substrate 103. As discussed above, the stress-related characteristic can include a stress profile, a knee stress, a center tension, a tension-strain energy, a birefringence, a spike depth, a depth of layer, a refractive index profile, or combinations thereof. For example, the signal(s) SA and/or SB can contain information about a refractive index profile for orthogonal polarization states (e.g., TE and TM), and a stress profile can be calculated by taking the difference between the two measured refractive index profiles (and dividing the difference by a stress optical coefficient, which can be measured using any means known to those skilled in the art).

In another set of embodiments, as shown in FIG. 8-12, methods can comprise disposing the substrate 103 on the sample holder 311 (e.g., in the cavity 319) with the coupling liquid 215 disposed on the first major surface 105 of the substrate 103 facing the viewing aperture 315, for example, with the coupling liquid 215 positioned between the first major surface 105 of the substrate 103 and the coupling surface 229 or 239 of a corresponding coupling prism 113*a* or 113*b*. In aspects, as shown, the substrate 103 can comprise a planar first major surface 105 (see FIGS. 8-12) or the substrate 103 can comprise a first major surface 105 (see FIGS. 3-7) that is curved. As shown in FIG. 8, the sample holder 311 can be positioned such that the viewing aperture 315 is aligned with the coupling surface 829 of the coupling prism 113 such that measurement beams can travel therethrough to the measurement location ML for both the EPCS apparatus and the LSP apparatus. As shown in FIG. 8, the second surface 825 of the coupling prism 113 can face the second detector 127. Also, as shown in FIG. 8, the first surface 823 of the coupling prism 113 can face the first detector 137 and/or the second light source 221. In aspects, the coupling prism can resemble and/or be identical to the coupling prism 901 or 1001 shown in FIGS. 9-10 with a first portion 903*a* or 1003*a* and a second portion 903*b* or 1003*b* that are non-parallel and correspond to the first surface 823 (see FIG. 8), for example with an internal angle therebetween within one or more of the ranges discussed above (e.g., from 150° to 170°). Alternatively or additionally, in aspects, as discussed above with reference to FIG. 11, a first internal angle θ5 between the first surface 823 and the coupling surface 829 can be different (e.g., greater than or less than) a second internal angle θ2 between the second surface 825 and the coupling surface 829.

Then, as shown in FIG. 8, aspects of methods can proceed to transmitting a first beam (e.g., along the second path 207) from a first beam source (e.g., second light source 221 that impinges the first surface 823 of the coupling prism 113, the coupling liquid 215, and the measurement location ML. As shown, methods can further comprise detecting at least a portion of the first beam (e.g., traveling along portion 207R of the second path) with the second detector 127 to generate signal SA. For example, the EPCS apparatus 121 and/or the signal SB can be used to determine a mode spectrum.

Also, as shown in FIG. 8, aspects of methods can comprise to transmitting a second beam (e.g., along the first path 205) from a second beam source (e.g., first polarization-switching light source 133 that impinges the first surface 823 of the coupling prism 113, the coupling liquid 215, and the measurement location ML. As shown, methods can further comprise detecting at least a portion of the second beam (e.g., traveling along portion 205S of the first path) with the first detector 137 to generate signal SB, which can be transmitted as signal SB to the controller 141. The EPCS apparatus and/or the signal SB can be used to determine a mode spectrum. In aspects, as shown in FIG. 12, at least a portion of the second beam travelling along the portion 205S of the first path can be reflected off of the reflecting device 1211 towards the first detector 137. In aspects, as shown in FIG. 12, at least a portion of the second beam travelling along the portion 205S of the first path can be reflected off of the reflecting device 1211 towards the first detector 137.

In aspects, the EPCS apparatus can comprise a lens 837 with an adjustable focal length positioned between the coupling prism 113 (e.g., first surface 823) and the first detector 137. In further aspects, methods can comprise setting or adjusting a focal length f of the lens 837 in accordance with the following relationship $$f = \frac{L}{1 + \frac{\gamma n_p L}{R1 \cos(\alpha)}}$$

where L is a distance between the lens and the first detector, R1 is a radius of curvature describing the curvature of the curved substrate at the measurement location, α is an angle of incidence of the first light beam when impinging the coupling surface of the prism, $n_p$ is a refractive index of the prism, and γ is a parameter based on the configuration of the curved substrate. In even further aspects, γ is from 1 to 2.

In aspects, the LSP measurement (e.g., transmitting the measurement beam along the second path 207) and the EPCS measurement (e.g., transmitting the measurement beam along the first path 205) can occur simultaneously. In further aspects the measurement beam travelling along the second path 207 can comprise an optical wavelength that is different than an optical wavelength of the measurement beam travelling along the second path 207. Alternatively, in aspects, the LSP measurement can occur before the EPCS measurement (e.g., in close succession). Alternatively, in aspects, the EPCS measurement can occur before the LSP measurement (e.g., in close succession).

In aspects, as shown, methods can further comprise emitting an additional beam from an additional beam source configured to travel along path 1301 and/or 1303 and impinge the substrate 103. As shown, there can be two additional beams configured to travel along path 1301 and

1303, but other numbers of additional beams can be provided in other aspects. In further aspects, as shown, the additional beam travelling along path 1301 may not impinge the coupling prism 113 nor the measurement location ML, although the additional beam travelling along the path 1303 may impinge a portion of the coupling prism 113 without impinging the measurement location ML. Providing the addition beam (e.g., path) can enable an orientation of the substrate 103 to be more accurately determined. For example, the curved substrate shown in FIG. 13 could have multiple orientations that produce the same cross-sectional view (that might lead to different calculated stress-based characteristics based on the measurements) as determined solely by the measurement beams discussed previously impinging the measurement location ML (e.g., second path 207 including portion 207R shown in FIG. 13 with the understanding that the first path is also included but omitted from FIG. 13 for clarity). However, the path(s) 1301 and/or 1303 of additional beams can distinguish between such configurations that would otherwise appear identical (but lead to different calculated stress-based characteristics based on the measurements). Consequently, information about the additional beam(s) traveling along the path 1301 and/or 1303 can be used by the controller 141, which can be configured to adjust a calculation used to determine the at least one stress-based characteristic based on at least the path 1301 and/or 1303 travelled by the additional beam.

Based on the signal SA and/or SB received by the controller 141, the controller can calculate at least one stress-related characteristic of the substrate 103. As discussed above, the stress-related characteristic can include a stress profile, a knee stress, a center tension, a tension-strain energy, a birefringence, a spike depth, a depth of layer, a refractive index profile, or combinations thereof. For example, the signal(s) SA and/or SB can contain information about a refractive index profile for orthogonal polarization states (e.g., TE and TM), and a stress profile can be calculated by taking the difference between the two measured refractive index profiles (and dividing the difference by a stress optical coefficient, which can be measured using any means known to those skilled in the art).

The above can be combined to provide apparatus and methods for determining a stress-related characteristic of substrate using a combined apparatus including both a LSP apparatus and a EPCS apparatus. A combined apparatus for measurements using LSP and EPCS can simplify and speed up the measurement process. Also, the combined apparatus reduces the risk of sample breakage because less handling is required to load the sample into the combined apparatus as compared to two separate apparatus. Methods of using the combined apparatus can additionally produce more reliable measurements for overall stress profiles.

The apparatus can perform measurements at a single, common location (e.g., on the first major surface of the substrate). In particular, curved substrates pose a problem both because (1) the measurements associated with stress-related characteristics can change over relatively short distances across the first major surface and (2) curved substrates are more prone to shifting, especially when moved, changing the location measured. For measuring curved substrate, the present disclosure provides a sample holders with a plurality of supports (e.g., first set, second set, devices) can prevent the substrate from adjusting (e.g., moving) when measuring the substrate.

In one set of embodiments, a sample holder can be provided that can secure and move the substrate so that measurements can be performed on the same location on the substrate using a combined apparatus, where each sub-apparatus (e.g., LSP and EPCS) can focus at physically different location, by securing and moving the substrate in the sample holder. Moving the sample holder away from the common plane defined by the coupling prisms when translating therebetween can reduce a risk of damaging (e.g., scratching) the substrate 103 during the process.

In another set of embodiments, both measurements (e.g., from the LSP apparatus and from the EPCS apparatus) can be performed using a single coupling prism and with the corresponding beams focused on a single measurement location (e.g., simultaneously). The apparatus can be configured to have at most one beam travelling in a given direction through each surface of the coupling prism (other than the coupling surface, which is unavoidable) to avoid mixing or interference between the signals. Consequently, the apparatus enable simultaneous or near simultaneous measurement at a common measurement location with both parts of the apparatus (e.g., from the LSP apparatus and from the EPCS apparatus). In aspects, providing a frustum surface of the coupling prism (and/or omitting an apex of the coupling prism) can reduce costs associated with the coupling prism without impairing the function of the coupling prism. For example, the reduced costs for a given size of coupling prism can enable a larger coupling prism to be used, which can further separate the paths associated with the second light source and the first detector. In aspects, providing two, non-parallel portions of a first surface of the coupling prism can enable both the second path and a portion of the first path to impinge respective portions at a substantially normal angles of incidence. Also, providing two, non-parallel portions of a first surface of the coupling prism can facilitate separation of the respective paths, which can facilitate physical arrangement of corresponding light source and detector (e.g., in a smaller physical footprint). In aspects, providing a reflecting device can facilitate physical orientation of the components in a reduced space.

Directional terms as used herein—for example, up, down, right, left, front, back, top, bottom—are made only with reference to the figures as drawn and are not intended to imply absolute orientation.

It will be appreciated that the various disclosed aspects may involve features, elements, or steps that are described in connection with that aspect. It will also be appreciated that a feature, element, or step, although described in relation to one aspect, may be interchanged or combined with alternate aspects in various non-illustrated combinations or permutations.

It is also to be understood that, as used herein the terms "the," "a," or "an," mean "at least one," and should not be limited to "only one" unless explicitly indicated to the contrary. For example, reference to "a component" comprises aspects having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, aspects include from the one particular value and/or to the other particular value. Similarly, when values are expressed as approximations, by use of the antecedent "about," it will be understood that the particular value forms another aspect. Whether or not a numerical value or endpoint of a range in the specification recites "about," the numerical value or endpoint of a range is intended to include two aspects: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In aspects, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

While various features, elements, or steps of particular aspects may be disclosed using the transitional phrase "comprising," it is to be understood that alternative aspects, including those that may be described using the transitional phrases "consisting of" or "consisting essentially of," are implied. Thus, for example, implied alternative aspects to an apparatus that comprises A+B+C include aspects where an apparatus consists of A+B+C and aspects where an apparatus consists essentially of A+B+C. As used herein, the terms "comprising" and "including", and variations thereof shall be construed as synonymous and open-ended unless otherwise indicated.

The above aspects, and the features of those aspects, are exemplary and can be provided alone or in any combination with any one or more features of other aspects provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the aspects herein provided they come within the scope of the appended claims and their equivalents.

What is claimed is:

1. An apparatus for determining at least one stress-related characteristic of a curved substrate, the apparatus comprising:
- a sample holder comprising a cavity configured to receive the curved substrate, the sample holder translatable in a first direction between a first configuration and a second configuration, the sample holder comprising:
  - a first set of supports configured to restrain movement of the curved substrate in the first direction;
  - a second set of supports configured to restrain movement of the curved substrate in a second direction perpendicular to the first direction;
  - a plurality of devices configured to hold a curvature of the curved substrate in a fixed configuration, the plurality of devices positioned within an area defined by the first set of supports and the second set of supports; and
  - a viewing aperture configured to allow a measurement beam to travel therethrough between the cavity and a location outside of the sample holder;
- a first prism positioned such that the viewing aperture that is configured to allow a first beam of the measurement beam to travel between the first prism and the cavity configured to receive the curved substrate when the sample holder is in the first configuration; and
- a second prism positioned such that the viewing aperture that is configured to allow a second beam of the measurement beam to travel between the second prism and the cavity configured to receive the curved substrate when the sample holder is in the second configuration.

2. The apparatus of claim 1, wherein the curvature comprises a first radius of curvature from 0.1 millimeters to 10 meters.

3. The apparatus of claim 2, wherein the curvature comprises a second radius of curvature perpendicular to the first radius of curvature, the first radius of curvature different from the second radius of curvature, and the second radius of curvature from 0.1 millimeters to 10 meters.

4. The apparatus of claim 1, wherein the plurality of devices comprises:
- a plurality of supports; or
- a plurality of vacuum ports configured to apply a vacuum to the curved substrate.

5. The apparatus of claim 1, wherein a coupling surface of the first prism and a coupling surface of the second prism are in a common plane, and the sample holder is configured to move the curved substrate away from the common plane when translating between the first configuration and the second configuration.

6. The apparatus of claim 1, further comprising a track comprising a raised portion positioned between two coplanar track portions in the first direction, wherein the sample holder is configured to translate along the track with the sample holder configured to travel over the raised portion when translating the first configuration and the second configuration.

7. The apparatus of claim 1, further comprising a light-scattering polarimetry sub-system comprising:
- a first beam source configured to transmit the first beam that impinges the first prism and the viewing aperture when the sample holder is in the first configuration; and
- a first detector configured to detect at least a portion of the first beam.

8. The apparatus of claim 1, further comprising an evanescent prism coupling spectroscopy sub-system comprising:
- a second beam source configured to transmit the second beam that impinges the second prism and the viewing aperture when the sample holder is in the second configuration; and
- a second detector configured to detect at least a portion of the second beam.

9. An apparatus for determining at least one stress-related characteristic of a substrate, the apparatus comprising:
- a sample holder comprising a cavity configured to receive the substrate, the sample holder comprising a viewing aperture;
- a prism positioned such that a measurement beam is configured to impinge the prism and the viewing aperture, the prism comprising a first surface, a second surface, an end surface, a coupling surface facing the viewing aperture, and a frustum surface extending between the first surface and the second surface;

a light-scattering polarimetry sub-system comprising a first beam source and a first detector, the first beam source configured to transmit a first beam of the measurement beam that impinges the end surface of the prism and the viewing aperture, the first detector configured to detect at least a portion of the first beam, and the at least a portion of the first beam configured to impinge the first surface of the prism; and an evanescent prism coupling spectroscopy sub-system comprising a second beam source and a second detector, the second beam source configured to transmit a second beam of the measurement beam that impinges the first surface of the prism and the viewing aperture, the second detector of the evanescent prism coupling spectroscopy sub-system configured to detect at least a portion of the second beam, and the at least a portion of the second beam configured to impinge the second surface of the prism.

10. The apparatus of claim 9, wherein the first beam and the second beam are configured to impinge substantially the same location of the viewing aperture.

11. The apparatus of claim 9, wherein the second surface of the prism faces the second detector.

12. The apparatus of claim 9, wherein the first surface of the prism faces at least one of the first detector or the second beam source.

13. The apparatus of claim 9, wherein the first beam source is configured to emit the first beam with a first wavelength different than a second wavelength of the second beam that the second beam source is configured to emit.

14. The apparatus of claim 9, wherein a first internal angle between the first surface and the coupling surface is greater than a second internal angle between the second surface and the coupling surface.

15. The apparatus of claim 9, wherein the first surface comprises a first portion and a second portion, the first beam configured to impinge the first portion of the first surface of the prism, the at least a portion of the second beam configured to impinge the second portion of the first surface of the prism, and the first portion and the second portion are non-parallel.

16. The apparatus of claim 15, wherein an internal angle between the first portion of the first surface and the second portion of the first surface is from 150° to 175°.

17. A method of determining at least one stress-related characteristic of a curved substrate comprising:

disposing the curved substrate on a sample holder, the sample holder positioned in a first configuration, the sample holder further holding a curvature of the curved substrate in a fixed configuration with a plurality of devices, a coupling liquid positioned between a first coupling surface of a first prism and a first surface of the curved substrate in a viewing aperture of the sample holder;

transmitting a first beam from a first beam source that impinges the first prism, the coupling liquid, and the first surface of the curved substrate at a measurement location;

detecting at least a portion of the first beam with a first detector to generate a first signal;

translating the sample holder from the first configuration to the second configuration in a first direction, the coupling liquid positioned between a second coupling surface of a second prism and the first surface of the curved substrate;

transmitting a second beam from a second beam source that impinges the second prism, the coupling liquid, and the first surface of the curved substrate at the measurement location;

detecting at least a portion of the second beam with a second detector to generate a second signal; and determining the at least one stress-related characteristic based on at least one of the first signal or the second signal.

18. The method of claim 17, wherein the disposing further comprises restraining movement of the curved substrate in the first direction with a first set of supports and restraining movement of the curved substrate in a second direction perpendicular to a second set of supports.

19. The method of claim 17, wherein the first coupling surface and the second coupling surface extend along a common plane, and the translating comprises moving the curved substrate away from the common plane when translating between the first configuration and the second configuration.

20. The method of claim 17, wherein a light-scattering polarimetry sub-system comprises the first beam source, the first prism, and the first detector, and the determining comprises processing the first signal to form an optical retardation versus depth curve.

21. The method of claim 17, wherein an evanescent prism coupling spectroscopy sub-system comprises the second beam source, the second prism, and the second detector, and the determining comprises processing the second signal to determine a mode spectrum.

22. The method of claim 17, wherein the stress-related characteristic comprises a stress profile, a knee stress, a center tension, a tension-strain energy, a birefringence, a spike depth, a depth of layer, a refractive index profile, or combinations thereof.

23. A method of determining at least one stress-related characteristic of a substrate comprising:

disposing a curved substrate on a sample holder, a coupling liquid positioned between a coupling surface of a prism and a first surface of the curved substrate in a viewing aperture of the sample holder;

transmitting a first beam from a first beam source that impinges an end surface of the prism, the coupling liquid, and the first surface of the curved substrate at a measurement location;

detecting at least a portion of the first beam with a first detector to generate a first signal, the at least a portion of the first beam impinging a first surface of the prism in traveling from the first surface of the curved substrate to the first detector;

transmitting a second beam from a second beam source that impinges the first surface of the prism, the coupling liquid, and the first surface of the curved substrate at the measurement location;

detecting at least a portion of the second beam with a second detector to generate a second signal, the at least a portion of the second beam impinging a second surface of the prism in travelling from the first surface of the curved substrate to the second detector;

determining the at least one stress-related characteristic of the curved substrate based on at least one of the first signal or the second signal; and wherein a first internal angle between the first surface and the coupling surface is greater than a second internal angle between the second surface and the coupling surface.

24. The method of claim 23, wherein the first beam source emits the first beam with a first wavelength that is different than a second wavelength of the second beam emitting by the second beam source.

25. The method of claim 23, wherein the transmitting a first beam and the transmitting the second beam occur simultaneously.

26. The method of claim 23, wherein a light-scattering polarimetry sub-system comprises the first beam source and the first detector, and the determining comprises processing the first signal to form an optical retardation versus depth curve.

27. The method of claim 23, wherein an evanescent prism coupling spectroscopy sub-system comprises the second beam source and the second detector, and the determining comprises processing the second signal is processed to determine a mode spectrum.

28. The method of claim 27, wherein the evanescent prism coupling spectroscopy sub-system further comprises a lens with an adjustable focal length positioned between the prism and the second detector, the method further comprising adjusting a focal length of the lens in response to at least a configuration of the curved substrate or a curvature of the curved substrate.

29. The method of claim 28, wherein the focal length f of the lens is adjusted in accordance with $$f = \frac{L}{1 + \frac{\gamma n_p L}{R1 \cos(\alpha)}}$$

where L is a distance between the lens and the first detector, RI is a radius of curvature describing the curvature of the curved substrate at the measurement location, $\alpha$ is an angle of incidence of the first light beam when impinging the coupling surface of the prism, $n_p$ is a refractive index of the prism, and $\gamma$ is a parameter based on the configuration of the curved substrate.

* * * * *